United States Patent [19]
Aoki et al.

[11] Patent Number: 5,793,443
[45] Date of Patent: Aug. 11, 1998

[54] MOTION VECTOR DETECTION CIRCUIT

[75] Inventors: Katsuji Aoki; Hiroaki Aono; Akiyoshi Tanaka, all of Kawasaki, Japan

[73] Assignee: Matsushita Electric Industrial Co., Ltd., Osaka, Japan

[21] Appl. No.: 903,024

[22] Filed: Jul. 30, 1997

Related U.S. Application Data

[62] Division of Ser. No. 363,120, Dec. 23, 1994, Pat. No. 5,659,364.

[30] Foreign Application Priority Data

Dec. 24, 1993 [JP] Japan .................. 5-329046
Dec. 24, 1993 [JP] Japan .................. 5-329078

[51] Int. Cl.⁶ ................................ H04N 7/36
[52] U.S. Cl. ........................ 348/699; 348/416
[58] Field of Search ................... 348/699, 402, 348/413, 415, 416, 401

[56] References Cited

U.S. PATENT DOCUMENTS 5,210,605  5/1993  Zaccarin et al. ............... 348/699
5,398,068  3/1995  Liu ............................. 348/416

Primary Examiner—Amelia Au
Attorney, Agent, or Firm—Lowe Hauptman Gopstein Gilman & Berner

[57] ABSTRACT

In a motion vector detection apparatus which processes a plurality of candidate blocks of pixels defined in a search range within a reference frame, to detect a candidate block having maximum correlation with an object block of M×N pixels in an object frame, a first input circuit receives successive pixels of the object block in respective clock periods and transfers each pixel to a specific one of a set of M×N processor circuits, while a second input circuit receives successive pixels of the search range and transfers each to a specific one of the processor circuits, such that the pixel values of a candidate block are respectively sequentially processed by each of the processor circuits in successive clock periods, with difference values between corresponding object and candidate block pixel values, generated by respective processor circuits, being cumulatively added to obtain an inter-block error value for that candidate block.

3 Claims, 24 Drawing Sheets

FIG. 22

| S(0, 0) | S(1, 0) | S(2, 0) |
|---|---|---|
| S(0, 1) | S(1, 1) | S(2, 1) |
| S(0, 2) | S(1, 2) | S(2, 2) |

FIG. 23

| R(-1, -1) | R(0, -1) | R(1, -1) | R(2, -1) | R(3, -1) |
|---|---|---|---|---|
| R(-1, 0) | R(0, 0) | R(1, 0) | R(2, 0) | R(3, 0) |
| R(-1, 1) | R(0, 1) | R(1, 1) | R(2, 1) | R(3, 1) |
| R(-1, 2) | R(0, 2) | R(1, 2) | R(2, 2) | R(3, 2) |
| R(-1, 3) | R(0, 3) | R(1, 3) | R(2, 3) | R(3, 3) |

MOTION VECTOR DETECTION CIRCUIT

This application is a division of application Ser. No. 08/363,120 filed Dec. 23, 1994, now U.S. Pat. No. 5,659,364.

BACKGROUND OF THE INVENTION

1. Field of the Invention

The present invention relates to a motion vector detection apparatus for use in motion interpolation encoding of successive images formed of arrays of picture elements, such as successive frames of a video signal, and in particular to a motion vector detection apparatus which utilizes the block matching technique.

2. Related Technology

At present, the most widely used algorithm for encoding a stream of images each expressed as an array of picture elements, such as successive frames of a digitized video signal, is the motion interpolation method. With that method, the amount of spatial displacement between images (assumed in the following to be video signal frames) which are displaced in time but should have a high correlation is obtained, as a motion vector. The motion vector is then used in encoding the data expressing successive frames, to minimize redundancy within the resultant encoded data. In general, the motion vector is detected by using the block matching technique. The basic features of that technique will be described in the following referring first to FIG. 1.

With the block matching technique, firstly a block of M×N (where M and N are fixed integers) pixels are defined in a frame which is currently being processed to derive a motion vector for that frame, and which will be referred to as the object frame. That M×N pixel block will be referred to as the object block, which is sequentially compared with each of a set of blocks that are each equal in size to the object block (referred to in the following as candidate blocks) that are defined within a specific region (referred to in the following as the search range) of a reference frame. The reference frame is close in time to the object frame within the succession of frames, and so should have high correlation with the object frame. In FIG. 1, the arrow 1504 represents a motion vector which expresses the degree of motion of the object block 1501 within the object frame 1500, in relation to the corresponding block 1502 within the reference frame 1503. Specifically, the pixel values of the object block 1501 are compared with the corresponding pixel values of each of a plurality of candidate blocks within a fixed search range 1505. Comparison is executed for each candidate block, for example, by calculating the respective amounts of absolute difference between the pixel values of the object block and the corresponding pixel values of the candidate block, and obtaining the sum of these absolute difference values, as an inter-block error value. The inter-block error values thus obtained for all of the candidate blocks within the search range are then compared, and the candidate block for which maximum correlation is obtained with the object block, is assumed to correspond to the object block 1501, so that the amount of spatial displacement between that candidate block and the position of the object block 1501 within the object frame 1500 (i.e the position if the object frame were to be superimposed in the reference frame) is the required motion vector.

A prior art motion vector detection apparatus for implementing the block matching technique for motion vector detection has been described in Japanese Patent Laid-open Publication No. HEI 2-213291. The principles of that prior art circuit will be described in the following, referring first to FIG. 2. To simplify the description, it is assumed that the circuit operates on an object block consisting of 2×2 pixels, using a search range which contains 3×3 candidate blocks. In FIG. 2, an array of nine error amount calculation processors are respectively designated as PR(1,1), PR(2,1) . . . PR(3,3), while a set of six data registers which temporarily hold pixel values that are within the search range, referred to as side registers, are respectively designated by numerals 10 to 15. A set of five input registers 16 to 20 serve to temporarily hold input pixel values that are within the search range, supplied from an external circuit. A minimum value detection circuit 21 serves to detect the smallest one of the inter-block error values that are produced from the processors PR(1,1) to PR(3,3), and detect the one of the processors that has produced that minimum value. The pixel values within the object block are supplied from an external circuit to an input terminal 24, referred to as input terminal S, while pixel values within the search range are supplied to $R_A$ and $R_B$ input terminals 22, 23.

A control circuit 25 supplies control signals CS and CO to the processors, with the signals CS acting on each processor to select a pixel value that is to be operated on by that processor during the current calculation clock period, with three possible input values being selectable for each processor. The control signal CT indicates the start of an inter-block error value calculation operation.

FIG. 3 is a circuit diagram showing the internal configuration of each of the processors PR(1,1) to PR(3,3) of the motion vector detection apparatus of FIG. 2. In FIG. 3, 31 denotes a data register, referred to as an A register, which temporarily holds pixel values within the search range, 32 is a subtractor, 33 denotes an exclusive-OR gate, 34 denotes an adder, 35 denotes a register referred to as a B register, for holding intermediate results of cumulative additions, and 36 denotes a register referred to as a C register, for holding inter-block error values. S(x,y) denotes a pixel value of the object block, supplied during a processing clock period to each of the processors via a common bus. R(i,j) denotes a pixel value that is within a search range that is specific to that processor, which is held in the A register 31 and is outputted from that register during a processing clock period.

The operation of this prior art motion vector detection apparatus is as follows, referring to FIG. 4 which shows the pixel values R11 to R65 within the search range of the reference frame and the pixel values S11 to S22 of the object block within the object frame. The pixel values within the search range are supplied from the $R_A$, $R_B$ input terminals 22, 23 in the sequence shown by the arrows in FIG. 4. Specifically, these pixel values are supplied from the input terminal 22 to the input register 18 in the sequence R(1,1), R(1,2), R(2,2), R(2,1), . . . R(4,1), and supplied from input terminal 23 to the input register 20 in the sequence R(1,3), R(1,4).

In addition, the respective pixel values S(x,y) within the object block are supplied via the input terminal 24 to the processors PR(1,1) to PR(3,3) in the sequence shown by the arrows in FIG. 4, i.e. the sequence S(1,1), S(1,2), S(2,2), S(2,1).

With the configuration shown in FIG. 3, for each of the processors PR(1,1) to PR(3,3), the subtracter 32 and the exclusive-OR circuit 33 function to calculate during each clock period the absolute value of difference |S(x,y) - R(i,j)| between a pixel value S(x,y) in the object block and a pixel value R(i,j) within the search range. In addition, the adder 34 and register 35 constitute a cumulative adder whereby the cumulative sum is obtained of the values |S(x,y) - R(i,j)| that are calculated by the subtracter 32 and exclusive-OR circuit 33 in each clock period. Hence, since the processor PR1.1 successively receives as inputs the pixel values within the search range in the sequence R(1,1), R(1,2), R(2,2), R(2,1) together with the corresponding pixel values within the object block, i.e. S(1,1), S(1,2), S(2,2), S(2,1), the processor PR(1,1) derives the cumulative sum:

|S(1,1)–R(1,1)|+|S(1,2)–R(1,2)|+|S(2,2)–R(2,2)|+|S(2,1)–R(2,1)|, the processor PR(1,2) derives the cumulative sum: R(2,4), R(2,3), ... R(4,3). Each of the processors PR(1,1) to PR(3,3) and side registers 10 to 15 receives, during a processing clock period, pixel values that were stored during the preceding clock period. Each of these pixel values is supplied from another processor, from a side register, or from an input register, with one of these being selected in accordance with the control signal CS. The input directions that are successively selected by the control signal CS can be expressed as follows, with respect to the positions shown in FIG. 2:

(1) Lower adjacent
(2) Right adjacent
(3) Upper adjacent
(4) Right adjacent
(5) Return to (1) above As a result, pixel values of the respective candidate blocks within the search range of the reference frame are sequentially supplied to the processors as: For processor PR(1,1): in the sequence R(1,1), R(1,2), R(2,2), R(2,1);

For processor PR(1,2): in the sequence R(1,2), R(1,3), R(2,3), R(2,2); .... ...... .....

For processor PR(3,3): in the sequence R(3,3), R(3,4), R(4,4), R(4,3).

|S(1,1)–R(1,2)|+|S(1,2)–R(1,3)|+|S(2,2)–R(2,3)|+|S(2,1)–R(2,2)|, ........ ......... .........

and the processor PR(3,3) derives the cumulative sum:
|S(1,1)–R(3,3)|+|S(1,2)–R(3,4)|+|S(2,2)–R(4,4)|+|S(2,1)–R(4,3)|

As a result, each of the processors PR(1,1) to PR(3,3) calculates, for a corresponding one of the candidate blocks within the search range of the reference frame, the respective inter-block error values for these candidate blocks. These error values are then set into the C registers 36 of the processors in response to the signal CT, which indicates the start of the succeeding inter-block error value calculation operation. The inter-block error values are subsequently sequentially read from the C registers 36, and transferred via buses (indicated by broken-line portions in FIG. 2) which interconnect the processors PR(1,1) to PR(3,3), to the minimum value detection circuit 21.

The minimum value detection circuit 21 detects the smallest of these inter-block error values, and in addition detects the position of the processor which has calculated that smallest inter-block error value. As described above, the processors PR(1,1) to PR(3,3) respectively calculate the inter-block error values for respective ones of the candidate blocks within the search range. Hence, the position of the processor which calculates the minimum inter-block error value indicates the position of the candidate block for which that minimum value has been obtained. The minimum value detection circuit 21 thereby obtains the amount of displacement between the object block and the candidate block for which the minimum inter-block error value was calculated, and so obtains the desired motion vector information.

With such a prior art motion vector detection apparatus, assuming that a motion vector is to be detected for an object block consisting of M×N pixels and a search range of H×V pixels, then in order to minimize the search range, i.e. in order to reduce the number of pixel values which must be supplied to the circuit in each clock period, it is necessary to use a total of H×2N side registers, and V+2N input registers, for holding pixel values which are within the search range but will not be used for calculation during the current clock period. As a result, the problem arises that the circuit becomes large in scale.

The type of apparatus described above provides motion vector detection with integer precision, i.e. to unit pixel accuracy. To attain greater accuracy, there have been proposals in the prior art to provide a motion vector detection apparatus which provides fractional precision for motion vector detection. With such a method, using the block matching technique described above, an optimum correlation candidate block (i.e. to integer precision) is first found with integer precision with respect to the object block, within a search range of the reference frame which can be referred to as the main search range, thereby obtaining a corresponding motion vector. To obtain fractional accuracy of motion vector detection, a restricted search range is then defined, using the pixel values of the aforementioned optimum correlation candidate block together with interpolated values which are calculated using the pixel values of that corresponding candidate block and specific pixel values which are adjacent to that corresponding candidate block within the main search range. Block matching is then executed for the the object block within that restricted search range, to obtain an optimum candidate block within the restricted search range. A motion vector having fractional precision is thereby obtained with respect to the restricted search range, which can be combined with the integer precision motion vector information, to obtain a fractional precision motion vector with respect to the main search range.

An example of a prior art motion vector detection apparatus for providing such fractional-pixel motion vector detection accuracy is described in U.S. Pat. No. 4,937,666. As shown in FIG. 6 of that disclosure, the apparatus basically consists of a set of memory circuits for storing the pixel values of the object frame, the reference frame, the search range, and the object block, a circuit referred to as an integer precision subcircuit which operates on pixel values of the object block and the search range to obtain an optimum correlation candidate block with respect to a main search range, i.e. to obtain integer precision motion vector information, and a circuit referred to as a fractional precision subcircuit which operates on pixel values of the object block and of a restricted search range to obtain a fractional precision motion vector with respect to the restricted search range. That fractional precision motion vector is then combined with the integer precision motion vector to obtain the a fractional precision motion vector with respect to the main search range.

Although the concept "restricted search range" is not clearly described in that patent disclosure, it is clear that such a set of pixels is defined, since as described in that disclosure, values representing the integer precision motion vector which are generated by the integer precision subcircuit are used to control a memory address generator such that appropriate pixel values from the main search range are utilized by the fractional precision subcircuit.

The essential features of the fractional precision subcircuit of that prior art patent will be described referring to the block circuit diagram of FIG. 5. It will be assumed that the circuit of FIG. 5 operates on an object block which is a 3×3 array of pixels, whose values S(i, j) are designated S(0,0) to S(2,2) respectively. A first sequence of pixel values R(i,j) of the restricted search range are supplied to an input terminal 601 in successive clock periods, while a second sequence of remaining pixel values P(i, j+1) of that region are supplied to a second input terminal 602. (It is assumed that values of "i" increase positively in the horizontal rightward direction of a pixel array, and that values of "j" increase positively in the vertical downward direction of a frame, with left-to-right and top-to-bottom scanning directions). The pixel values R(i, j) are thereby supplied to one input of an adder 603 and one input of a selector 604, while the pixel values R(i,j+1) are supplied to the other input of adder 603. The adder 602 includes an output value halving function, whereby each sum value produced is divided by two. The resultant values are successively set into a latch 606. The selector 604 is controlled such as to alternately select the values of the sequence R(i,j+1) and the output values from adder 603, in successive clock periods. The combination of selector 604 and adder 603 is designated as the V interpolation circuit 605, for executing interpolation of pixel values in the vertical array direction. Each output value from the V interpolation circuit 605 is sequentially set into latches 606, 607 and 608 in successive clock periods. The delayed output values from latches 606 and 608 are supplied to an adder 609, which constitutes an H interpolation circuit 610. The adder 609 also executes the aforementioned output halving function. The output values from latch 608 are also supplied to a bus, designated as the R1 bus 611, and output values from adder 609 to a bus which is designated as the R2 bus 612. The object block pixel values S(i,j) are sequentially supplied via an input terminal 613 to a bus which is designated as the S bus 614. A subtractor 619 calculates the difference between each object block pixel value S(i,j) and a search range pixel value from the R1 bus 611, the result delayed by one period in a latch 615, then the absolute value is derived by an absolute value circuit 620, and set in a latch 616. Each delayed output value from latch 616 is supplied to one input of an adder 621, and the resultant sum values are delayed in two cascade-connected latches 617, 618 before being supplied to the other input of the adder 621. The subtractor 619, latch 615, absolute value circuit 620, adder 621 and latches 616 to 618 constitute a calculation circuit which will be referred to as the No. 1 processor 622. The object block pixel values S(i,j) and the output values from the H interpolation circuit 610 are supplied to a No. 2 processor 623, which is of identical configuration to the processor 622. The processors 622 and 623 derive respective inter-block error values for candidate blocks within the search range (i.e. restricted search range, which is formed of the aforementioned interpolation pixel values from the reference frame) which are each temporarily held in the latches 618 of the processors 622, 623, and these are supplied to a minimum value detection circuit 54 which detects the candidate block for which a minimum inter-block error value has been obtained. The i, j component values of the motion vector within the restricted search range are thereby derived, and sent to output terminals 625.

A more specific description of the circuit of FIG. 5 will be given, assuming that the circuit operates on an object block which is a 3×3 array of pixels, whose values S(i, j) are designated S(0,0) to S(2,2) respectively. The operation will be described referring to the appended Table 1, in which the column "Clock" defines successive processing clock periods. The reference frame pixel values which are supplied to the input terminals 601 and 602 will be referred to as the search range pixel values. As shown, successive ones of these search range pixel values are each supplied to the input terminals 601, 602 during two consecutive clock periods. In the case of input terminal 601, the sequence is R(0,0), R(1,0), R(2,0), R(3,0), R(0,1), R(1,1), R(2,1), R(3,1), R(0,2), R(1,2), R(2,2), R(3,2). In the case of input terminal 602, the sequence is R(0,1), R(1,1), R(2,1), R(3,1), R(0,2), R(1,2), R(2,2), R(3,2), R(0,3), R(1,3), R(2,3), R(3,3). Thus each pixel value supplied to input terminal 602 is delayed with respect to that supplied to input terminal 601 in the same clock period by an amount representing one pixel displacement in the vertical direction of the array. For that reason, the pixel values supplied to input terminal 602 are designated as R(i,j+1).

In the V interpolation circuit 605, the adder 603 obtains, in each clock period, a sum R(i,j)+R(i,j+1), and divides that sum by two, to obtain an interpolation value which is designated R(i,j+0.5). The selector 604 alternately selects the pixel values R(i,j) from input terminal 601 and the interpolation pixel values R(i,j+0.5) from the adder 603, so that the values shown in the column for latch 606 in Table 1 are successively set therein, then in latches 607 and 608. In the H interpolation circuit 610, the adder 609 obtains the sum of the values that are currently held in latches 606, 608. Each value produced from latch 608 is thus delayed by two clock periods with respect to that value being produced from latch 606. Designating the value held in latch 608 as R(i,j), the value held in latch 606 is R(i+1,j), so that the adder 609 produces the interpolation value R(0.5,j). Similarly, assuming that the interpolation pixel value R(i,j+0.5) is held in the latch 608, then the interpolation pixel value R(i+1,j+0.5) is held in the latch 606, so that the interpolation pixel value R(i+0.5,j+0.5) is supplied to the bus 612. As a result, the sequences of values supplied to the R1 bus 611 and R2 bus 612 are as indicated by the corresponding columns in Table 1.

The object block pixel values S(i,j) are sequentially supplied to the bus 614, each being supplied for two consecutive clock periods, as shown in the corresponding column of Table 1. For each pixel value of S(i,j), the first period in which the value is supplied is synchronized with that in which the correspondingly positioned pixel value within the search range is being supplied to bus 611. The processor 622 executes the following pipeline operations. The difference between the values which are supplied to buses 611 and 614 is obtained by the subtractor 619, and the result set in the latch 615. The absolute value of that difference value is then obtained by the absolute value circuit 620, and the result set in the latch 616. In addition, the cumulative sum of the difference values is derived once in every two clock periods, by the cumulative addition circuit that is formed of the cascaded latches 617, 618 and the adder 621, operating on the values that are set into the latch 616.

As shown by the timings in Table 1, during two clock periods from the third clock period, a pixel value R(i,j) is being outputted to bus 611 and the pixel value S(i,j) outputted to bus 614. During two clock periods from the fourth clock period, the interpolated pixel value R(i, j+0.5) is outputted to the bus 611 and the pixel value S(i,j) is supplied to bus 614. As a result, the No. 1 processor 622 derives the cumulative sums S(i,j) R(i,j) and S(i,j)–R(i, j+0.5), i.e. derives the inter-block error values $D_{0,0}$ and $D_{0,0.5}$. The processor 233 has the same configuration as processor 622, but differs in being connected to the bus 612 rather than to bus 611. Hence, the processor 623 calculates the cumulative sum values S(i,j)–R(i+0.5,j) and S(i,j) R(i+0.5, j+0.5), i.e. derives the inter-block error values $D_{0.5,0}$ and $D_{0.5,0.5}$. The inter-block error values $D_{v,w}$ that are calculated by processors 622, 623 (where v, w each take values 0 or 0.5) are transferred to the minimum value detection circuit 624, to obtain the smallest inter-block error value, $D_{x,y}$. The displacement values x,y between the object block and the candidate block for which the minimum inter-block error value $D_{x,y}$ has been calculated (i.e. the motion vector components) are outputted to the terminal 625, then combined with integer-accuracy displacement values, to obtain the required complete fractional-accuracy motion vector information.

However with such a prior art fractional-accuracy motion vector detection apparatus, there is the disadvantage that only the pixel values S(i,j) and the pixel values or interpolated pixel values R(i+v,j+w) exist. Thus it is only possible for the processors to obtain the inter-block error values $D_{v,w}$. That is to say, only positive component values for a fractional-accuracy motion vector with respect to the restricted search range can be obtained, for example within the search range to 0.5, in each of the horizontal and vertical directions. With the apparatus described, it would not be possible to obtain negative component values of the fractional-accuracy motion vector, in the horizontal and vertical directions.

SUMMARY OF THE INVENTION

It is a first objective of the present invention to overcome the disadvantages of the first prior art type of motion vector detection apparatus described hereinabove, by providing a motion vector detection apparatus which utilizes the block matching technique, but which can be smaller in circuit scale than prior art types of such motion vector detection apparatus.

It is a second objective of the invention to overcome the disadvantages described above of prior art types of fractional-precision motion vector detection apparatus employing the block matching technique, by providing a fractional-precision motion vector detection apparatus wherein interpolated pixel values are obtained for interpolation positions within a frame of pixels, and wherein the interpolation positions can take either negative or positive component values, with respect to a reference position in an object block, so that the resultant fractional motion vector components can take either positive or negative values, in both the horizontal (i.e. row) and vertical (i.e. column) directions.

To achieve the first objective set out above, the invention provides a motion vector detection apparatus for detecting, within a search range formed of an array of picture elements in a reference image, a candidate block having maximum correlation with an object block which is formed of an array of M×N picture elements in an object image where M and N are fixed integers, with the reference and object images being separated in time within a stream of images each formed of an array of picture elements and with a set of candidate blocks each of identical size to the object block being defined in the search range. The apparatus has a first input circuit which receives successive pixels of the object block in respective clock periods and transfers each pixel to a specific one of a set of M×N processor circuits, while a second input circuit receives successive pixels of the search range and transfers each to a specific one of the processor circuits, such that the pixel values of a candidate block are respectively sequentially processed by each of the processor circuits in successive clock periods, with difference values between corresponding object and candidate block pixel values, generated by respective processor circuits, being cumulatively added to obtain an inter-block error value for that candidate block. As a result, successive interblock error values for each of the candidate blocks are generated in sequential clock periods. The candidate block having maximum correlation can thereby be detected.

More specifically, such an apparatus comprises:

M×N processors, each of said processors comprising a first register, and an absolute value subtractor circuit for deriving the absolute value of difference between first and second input values supplied thereto, said first input value being supplied from said first register;

memory means for supplying said M×N object block picture element values and said search range picture element values in respective predetermined sequences of picture element values;

object block picture element value input circuit means coupled to receive said M×N object block picture element values, for selectively transferring each of said object block picture element values to be set into said first register of a predetermined one of said processors;

search range picture element value input circuit means coupled to receive said search range picture element values, for selectively transferring each of said search range picture element values to said absolute value subtractor circuit of a predetermined one of said processors, as said second input value to said absolute value subtractor circuit, to thereby obtain an absolute value difference value between said search range picture element value and said object block picture element value from said first register of said predetermined processor;

cumulative addition circuit means coupled to receive respective absolute value difference values produced from said M×N processors, to thereby calculate respective cumulative sum values obtained for said candidate blocks; and a minimum value detection circuit for detecting a smallest one of said cumulative sum values, to thereby detect one of said candidate blocks which corresponds to said smallest cumulative sum value.

With such a configuration, it becomes unnecessary to utilize registers having the functions of the side registers of the aforementioned prior art example to temporarily hold picture element values. Instead, for each candidate block, the respective M×N picture element values of that block are processed (in conjunction with the corresponding values of the object block) in successive clock periods by respective ones of the set of M×N processors. As a result it becomes possible to provide a motion vector detection apparatus, for executing the block matching technique, which is of smaller circuit scale than has been possible in the prior art.

In another aspect of the invention, to overcome the disadvantages set out hereinabove of prior art types of fractional precision motion vector detection apparatus, the invention provides a motion vector detection apparatus which includes means for detecting, within a main search region formed of an array of picture elements in a reference image, a first candidate block, having maximum correlation with an object block which is formed of an array of picture elements in an object image, with the reference and object images being separated in time within a stream of images each formed of an array of picture elements and with a set of first candidate blocks each identical in size to the object block being defined in the main search region, the apparatus comprising:

means for successively supplying picture element values within a restricted search range, said restricted search range consisting of picture element values from said reference image including the values of said first candidate block having maximum correlation, and for successively supplying the picture element values of said object block;

interpolation circuit means coupled to receive said restricted search range picture element values, responsive to each of said restricted search range picture element values for outputting a set of picture element values comprising said each restricted search range picture element value together with a plurality of associated interpolated picture element values;

delay circuit means coupled to receive said object block picture element values, responsive to each of said object block picture element values for outputting a set of picture element values comprising said each object block picture element value together with a plurality of associated delayed picture element values;

a plurality of processor circuits equal in number to plurality of second candidate blocks which are within said restricted search range, each of said candidate blocks being of identical size to said object block, each of said processor circuits being coupled to said interpolation circuit means and delay circuit means and including means for calculating a value of absolute difference between one of said set of picture element values from said interpolation circuit means and one of said set of picture element values from said delay circuit means and means for calculating a cumulative sum value of said absolute difference values for a corresponding one of said second candidate blocks;

minimum value detection circuit means for detecting a smallest one of respective cumulative sum values produced from said processor circuits, and for thereby detecting one of said second candidate blocks having maximum correlation with said object block; and combining circuit means for combining motion vector information expressed by respective positions of said first candidate block having maximum correlation and said second candidate block having maximum correlation, to obtain fractional precision motion vector information for said object block with respect to said main search range;

wherein said interpolation circuit comprises means for generating said interpolated picture element values such that said interpolated picture element values include, in relation to each of said object block picture element values, interpolated picture element values having positive and negative positions in relation to said each object block picture element value, in both row and column directions of said object block.

With such a fractional precision motion vector detection apparatus, the delay circuit means delays successive ones of the pixel values S(i,j) of the object block S such that pixel values S(i+p, j+q) are obtained, where p and q can each take the values:

$$\ldots -2, -1, 0, 1, 2 \ldots$$

These values are supplied, each paired with a corresponding one of a set of interpolated and directly supplied values that are within the restricted search range, to respective ones of a set of processors, i.e. with the number of processors being equal to the number of picture elements constituting the object block. Each of the processors calculates an inter-block error value $D_{(v-p), (w-q)}$ for a corresponding one of the candidate blocks within the restricted search range. Thus, a motion vector can be detected to fractional precision within a restricted search range of - v - p to v - p in the horizontal (i.e. row) direction and - w - q to w - q in the vertical (i.e. column) direction.

BRIEF DESCRIPTION OF THE DRAWINGS

FIG. 22 and 23 are diagrams conceptually illustrating an object block, and a restricted search range which is based on a candidate block that has maximum integer-precision correlation with the object block;

DESCRIPTION OF PREFERRED EMBODIMENTS

Figure 6:
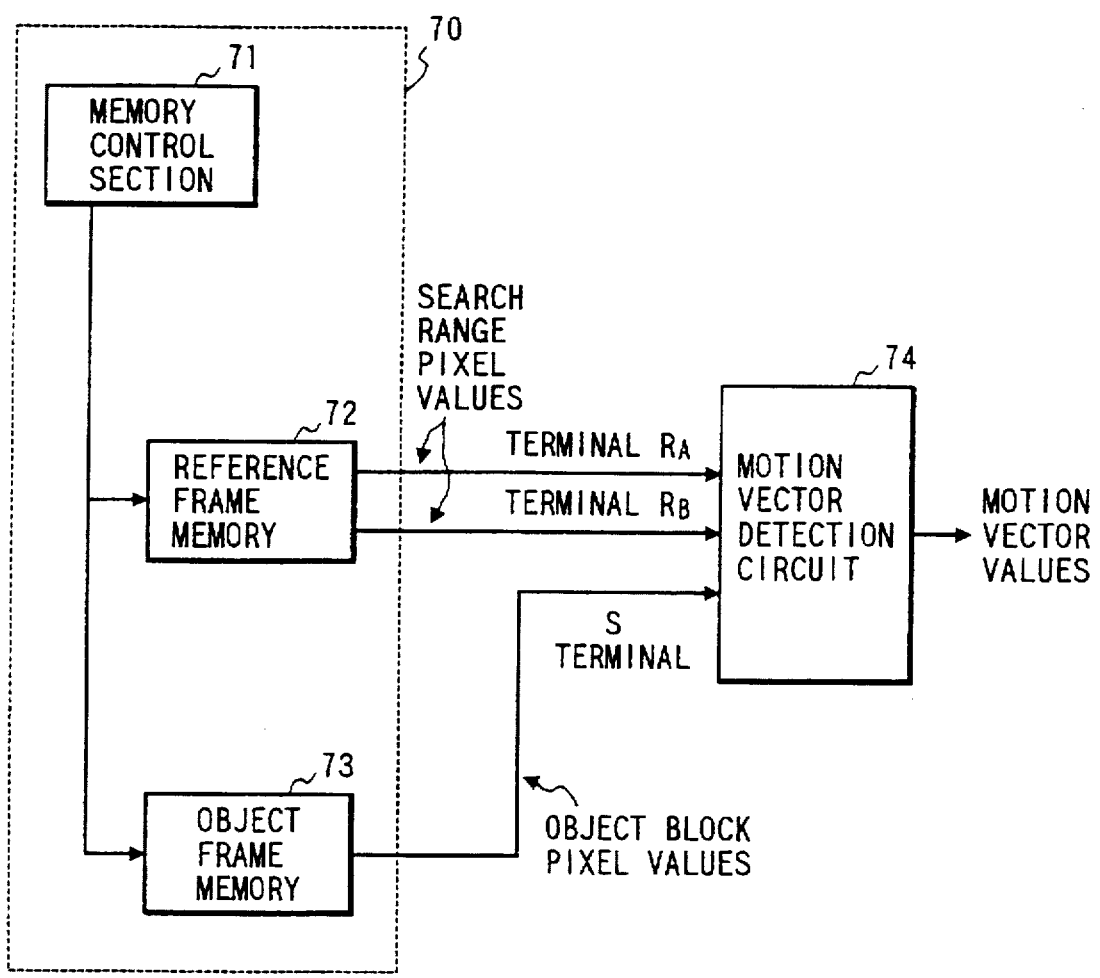
FIG. 6 is a general block diagram showing the basic configuration of a first embodiment of a motion vector detection apparatus according to the present invention.

A first embodiment of a motion vector detection apparatus according to the present invention will be described, referring first to the general block diagram of FIG. 6 which illustrates the basic configuration of the apparatus. In FIG. 6, a memory apparatus 70 includes a memory control section 71 which controls data read-out from a reference frame memory 72 and a object frame memory 72. Each of the frame memories 72, 73 successively stores respective ones of a time-sequential stream of video signal frames, each frame consisting of successive pixel values corresponding to a 2-dimensional array of pixels, with the frames held in the frame memories 72, 73 being at different time positions in the frame sequence. The frame currently held in the frame memory 72 will be referred to as the reference frame, and that held in frame memory 73 as the object frame. The memory control section 71 controls the reference frame memory to read out two predetermined sequences (described hereinafter) of pixel values of the reference frame which are within a specific range, i.e. the search range, while the object frame memory 72 is controlled to read out a sequence of pixel values of an object block that is within the object frame. The three pixel value sequences are supplied to a motion vector detection circuit 74, which operates on them to derive a motion vector for the object block with respect to the reference frame.

Figure 7:
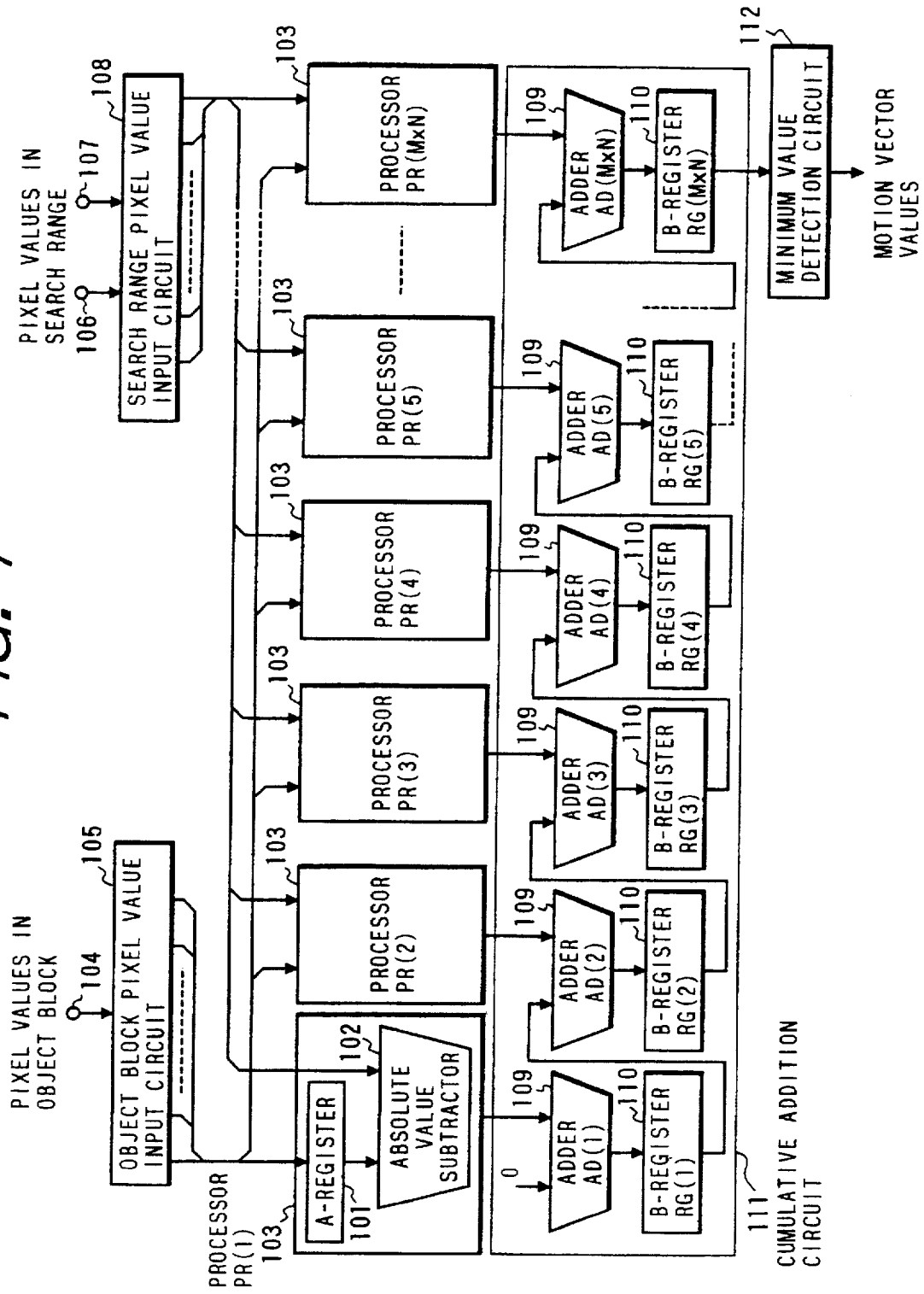
FIG. 7 is a block circuit diagram of a motion vector detection circuit of the first embodiment.

FIG. 7 is a block circuit diagram of the motion vector detection circuit 74 of FIG. 6. The circuit can operate on an object block of size M×N pixels, where M and N are arbitrary integers. In FIG. 7, a set of M×N processing circuits 103, referred to in the following as processors, are respectively designated as PR(1) to PR(M×N), with each of these processors consisting of a register designated as an A-register 101 for temporarily holding pixel values within the search range, and an absolute difference value calculation circuit 102 (referred to in the following simply as an absolute value subtractor), as shown for the processor PR(1). Each absolute value subtractor 102 derives the absolute value of the difference between two values which are supplied thereto. An input terminal, designated as the S input terminal 104, sequentially receives the pixel values of the object block which are produced from the memory apparatus as described above, and supplies these to a object block pixel value input circuit 105. The object block pixel value input circuit 105 transfers these pixel values in a predetermined manner to each A-register 101 within the processors PR(1) to PR(M×N). Two input terminals, designated as the Ra input terminal 106 and the Rb input terminal 107, receive respective sequences of pixel values within the search range that is defined in the reference frame, and supply these values to a search range pixel value input circuit 108. The search range pixel value input circuit 108 supplies these pixel values in a predetermined manner, as described hereinafter, to the absolute value subtractor circuit 102 within specific ones of the processors PR(1) to PR(M–N). In a cumulative addition circuit 111, a set of adders 109 which respectively receive input values from the processors PR(1) to PR(M×N) are designated as AD(1) to AD(M×N), and generate cumulative addition values which are temporarily held in respective ones of a set of registers 110, designated as B-registers RG(1) to RG(M×N). The cumulative addition circuit 111 thus consists of a total of M×N cascaded circuit sections, each circuit section consisting of an adder 109 which receives absolute difference values as one input thereto, and a B-register 110 which temporarily holds an output value produced from the adder 109. As shown, the outputs from the B-registers RG(1) to RG(M×N–1) are successively connected in cascade to inputs of the adders AD2 to AD(M×N) respectively. A final cumulative sum value is thereby produced from the B-register RG(M×N), and supplied to a minimum value detection circuit 112.

Figure 8:
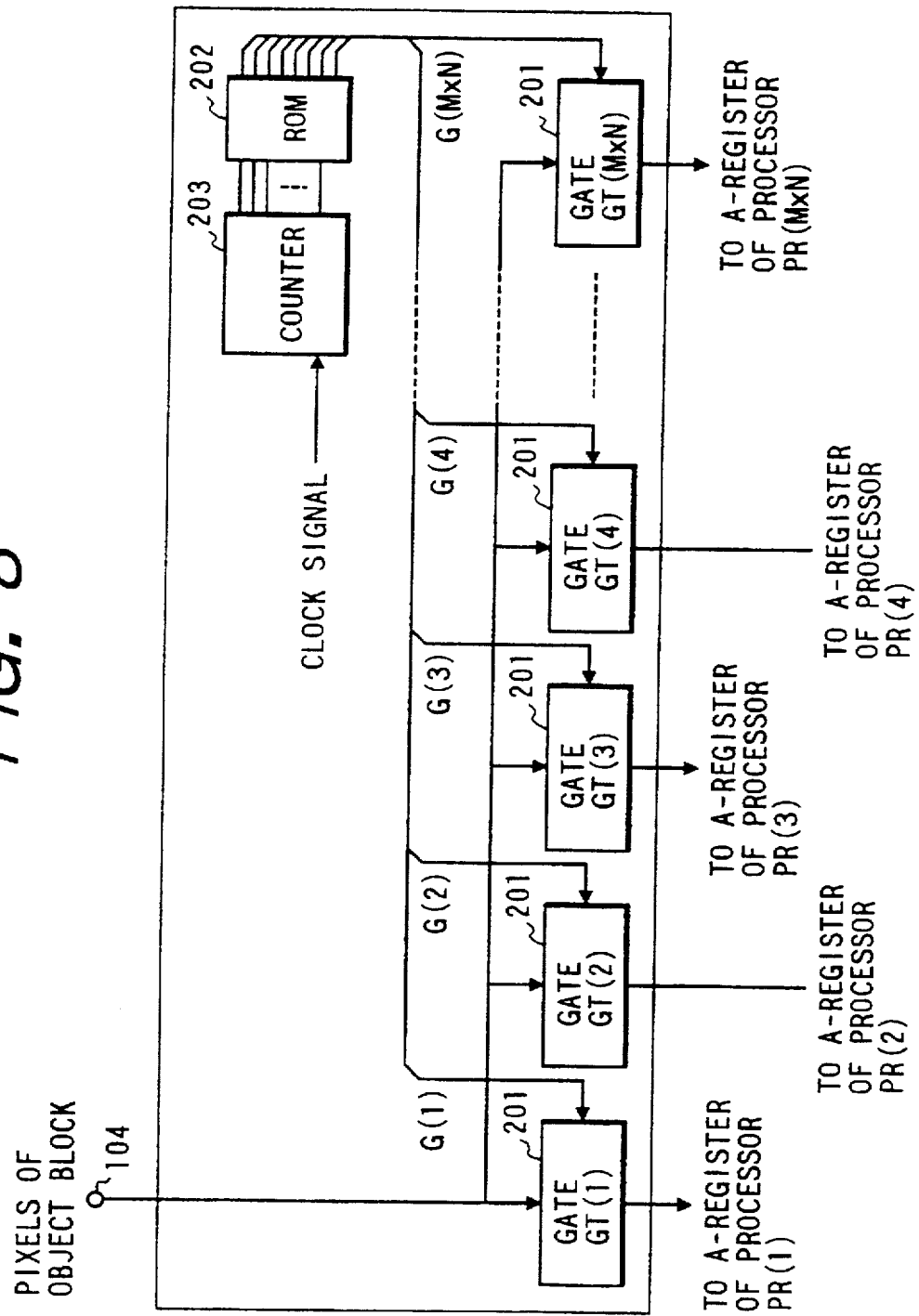
FIG. 8 is a block circuit diagram of an object block pixel value input circuit used in the circuit of FIG. 7.

FIG. 8 is a block circuit diagram of the configuration of the object block pixel value input circuit 105 of FIG. 7. In FIG. 8, GT(1) to GT(M×N) denote a set of gates (i.e. switch circuits) 201, which are controlled by respective control signals G(1) to G(M×N). These control signals are generated by read-out from a ROM 202, in response to address signals generated by a counter 203.

Figure 9:
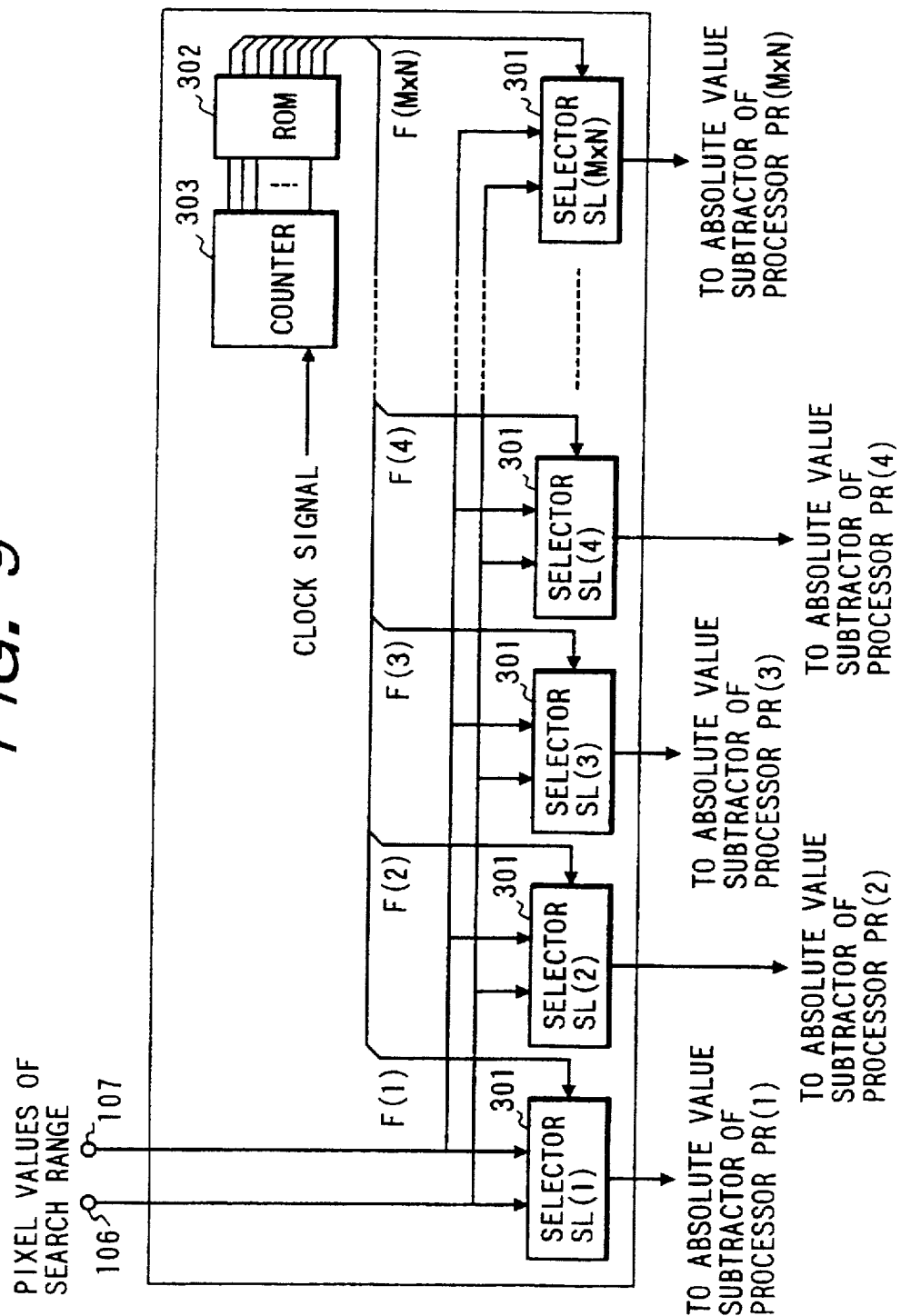
FIG. 9 is a block circuit diagram of a search range pixel value input circuit used in the circuit of FIG. 7.

FIG. 9 is a block circuit diagram of the search range pixel value input circuit 108 of FIG. 7. In FIG. 9, SL(1) to SL(M×N) denote respective ones of a set of selector circuits 301, which are controlled by respective control signals F(1) to F(M×N). These control signals are generated by read-out from a ROM 302, in response to address signals generated by a counter 303. Each selector circuit is controlled to select a pixel value supplied from either the Ra input terminal or the Rb input terminal, in accordance with the binary state of the corresponding control signal.

Figure 10:
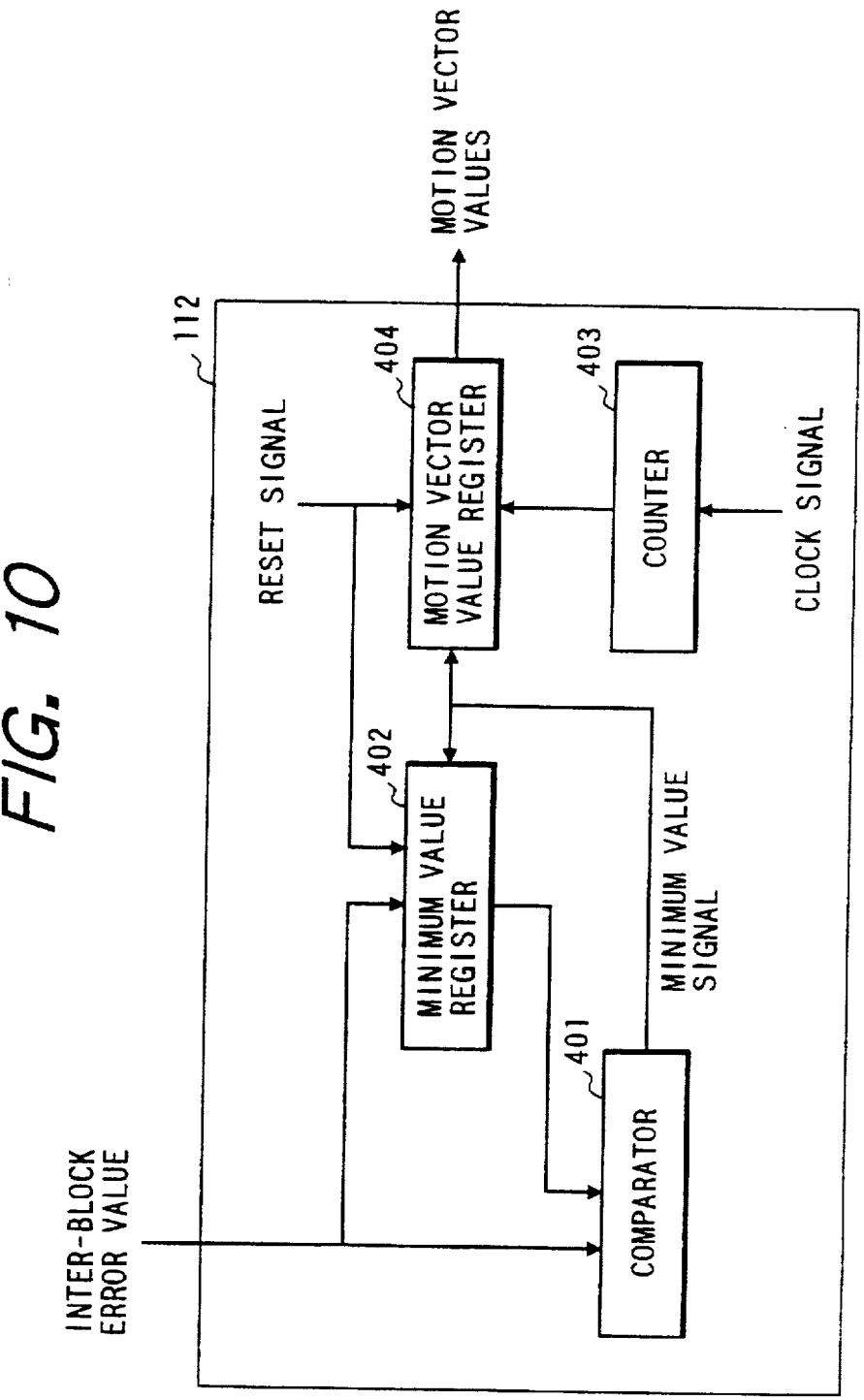
FIG. 10 is a block circuit diagram of a minimum value detection circuit used in the circuit of FIG. 7.

FIG. 10 is a block circuit diagram of the minimum value detection circuit 112 of FIG. 7. In FIG. 10, 401 denotes a comparator, 402 denotes a motion vector register for holding a motion vector supplied from a motion vector register 402, 403 denotes a counter which generates motion vector values in accordance with respective clock periods, and 404 is a motion vector value register for holding motion vector values. It should be understood that the term "motion vector value" is used herein for brevity, to signify a pair of vertical-direction and horizontal-direction component values which define a motion vector, i.e. the frame column and row components of the motion vector.

Figure 11:
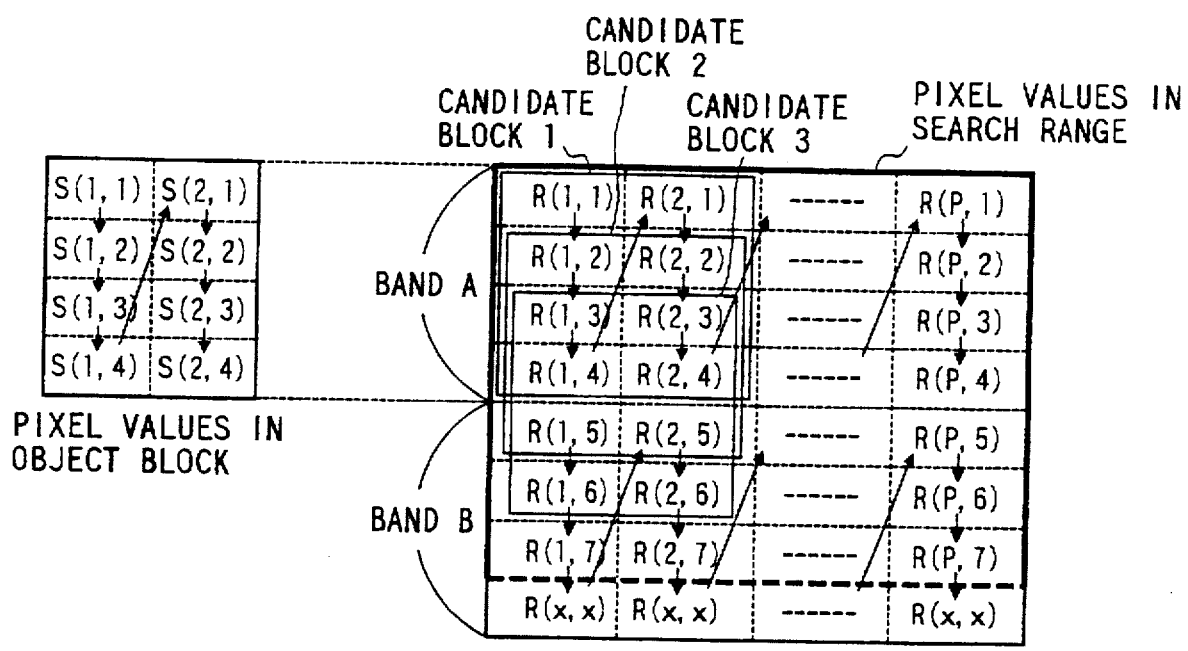
FIG. 11 is a conceptual diagram showing an object block in relation to a search range, for use in describing the operation of the first embodiment of the invention.

In the following description of the embodiment of FIG. 7 it will be assumed, for simplicity of description, that the values M=2 and N=4 are applicable, i.e. there are a total of eight processors, designated as PR(1) to PR(8) respectively. FIG. 11 illustrates the relationship between the pixels of the search range and the object block, in that case. The pixel values of the object block will be designated as S(x,y), and those of the search range as R(i,j). Firstly, the pixel values of the object block are sequentially supplied to the object block pixel value input circuit 105 from the S input terminal 104 in the sequence indicated by the arrows in FIG. 11, i.e. the sequence S(1,1), S(1,2) ... S(2,4). For each of the gates GT(1) to GT(8), when the corresponding one of the control signals G(1) to G(8) which controls that gate goes to the high logic level, that gate transfers a pixel value of the object block from the S input terminal 104 to the A-register 101 of the corresponding one of the processors PR(1) to PR(M×N).

Figure 12:
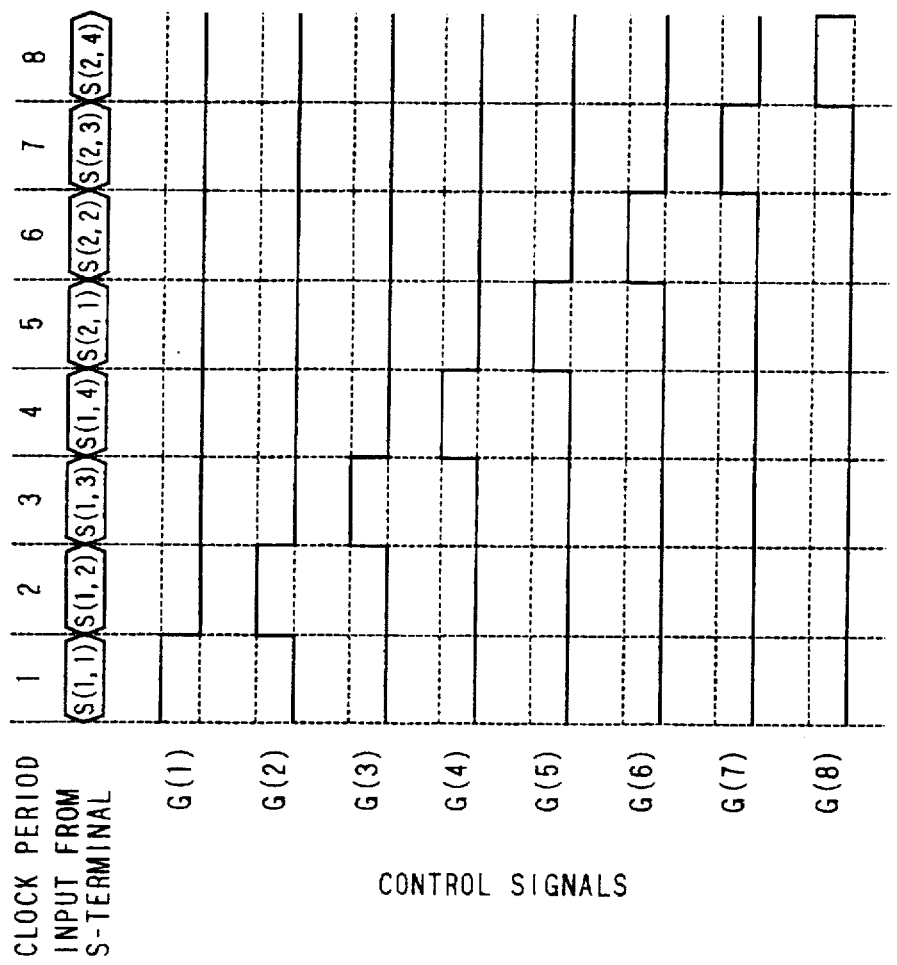
FIG. 12 is a timing diagram showing timings of control signals used in the object block pixel value input circuit of FIG. 8.
Figure 13:
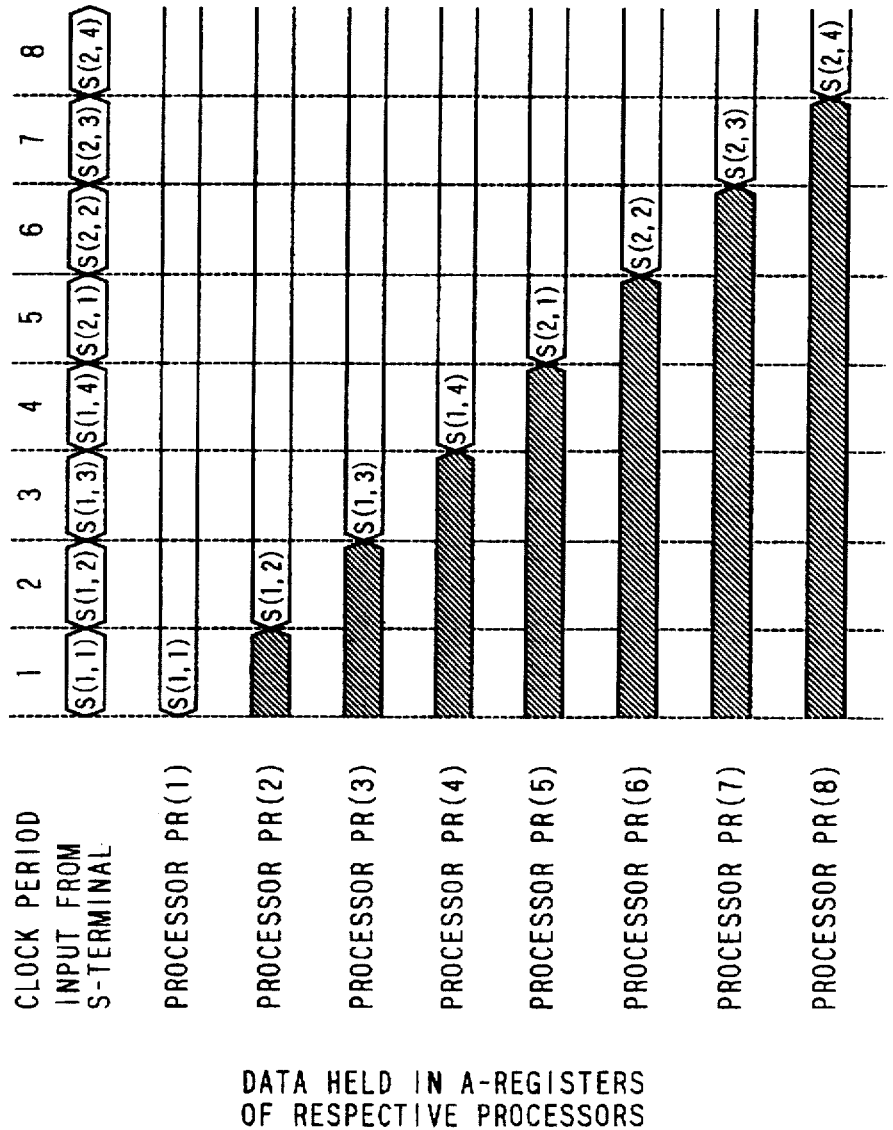
FIG. 13 is a timing diagram showing timings of setting object block pixel values into respective processors in the circuit of FIG. 7.

FIG. 12 shows the signal pattern of the control signals G(1) to G(8). As a result, as shown in FIG. 13, the pixel values of the object block are set into respective A-registers 101 of the processors PR(1) to PR(M×N) in the following manner:

S(1,1) into the A-register of processor PR(1);
S(1,2) into the A-register of processor PR(2);
S(1,3) into the A-register of processor PR(3);
S(1,4) into the A-register of processor PR(4);
S(1,5) into the A-register of processor PR(5);
S(1,6) into the A-register of processor PR(6);
S(1,7) into the A-register of processor PR(7);
S(1,8) into the A-register of processor PR(8).

In FIG. 11 it is assumed that the search range has an undefined width P pixels and a height of 7 pixels. The search range pixel values are supplied in two concurrent sequences, with the pixel values of one sequence being within of an upper set of rows of pixels, indicated as band A, and the pixels of the other sequence being within a lower band B, each band being four pixels in height. The pixel values of the band A are supplied to the search range pixel value input circuit 108 from the $R_A$ input terminal 106 in the sequence indicated by the arrows in FIG. 11, i.e. R(1,1), R(1,2), R(1,3), R(1,4), R(2,1) R(2,2), R(2,3) R(2,4) . . . R(P,4). Similarly the pixel values of the band B are supplied to the search range pixel value input circuit 108 from the $R_B$ input terminal 107 in the sequence indicated by the arrows, i.e. R(1,5), R(1,6), R(1,7), R(x,x), R(2,5) R(2,6), R(2,7) R(x,x) . . . R(P,7), R(x,x). Here, "(x,x) signifies a value which is not actually used, and so is not relevant. Candidate blocks within the search range, extending downward from band A, are indicated as candidate blocks 1, 2, 3, . . . in FIG. 11. There is a delay of N clock periods (in this case, four clock periods) between the start of supplying to the search range pixel value input circuit 108 the pixel values of band A and the start of supplying the pixel values of band B.

Figure 14:
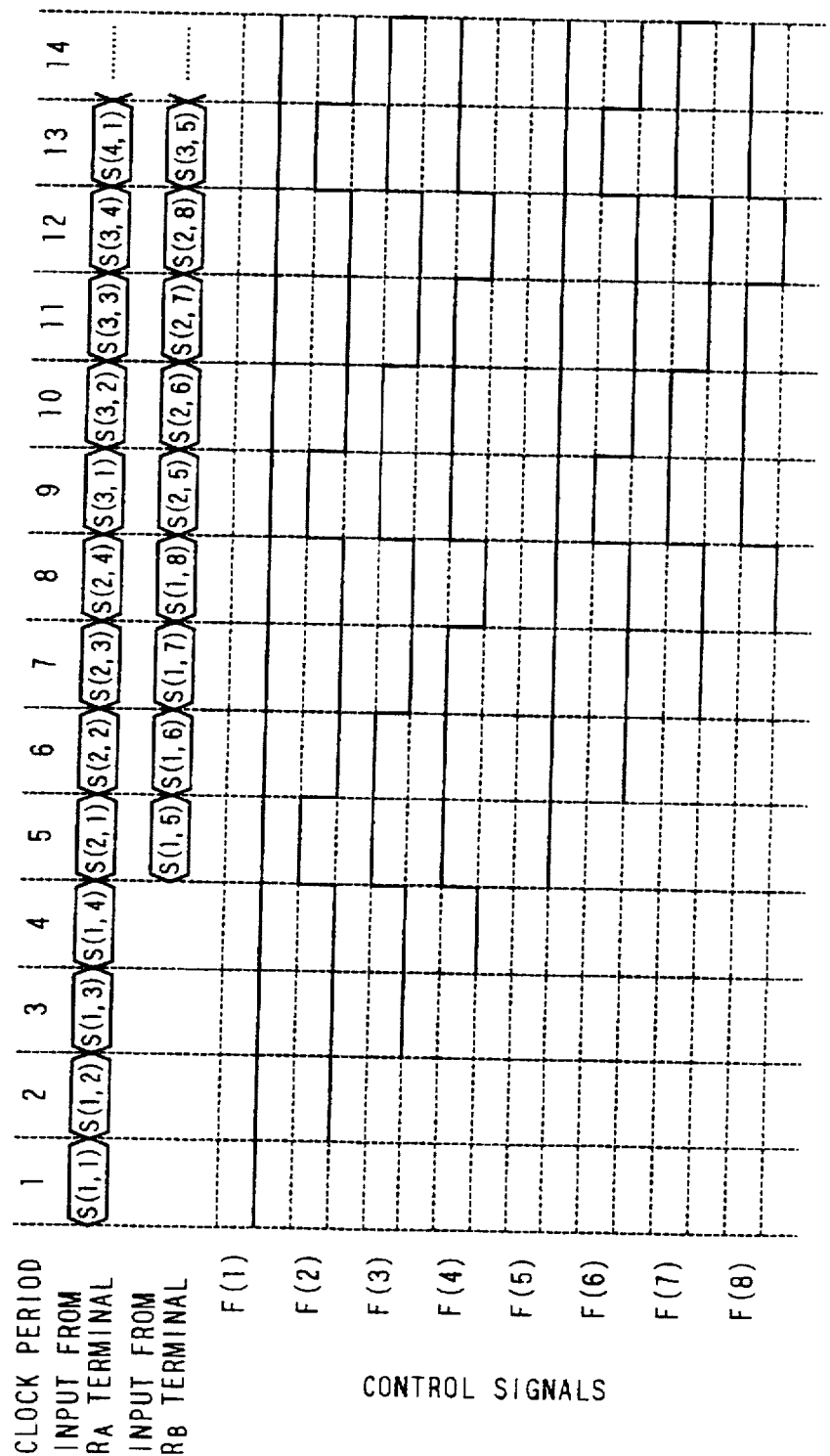
FIG. 14 is a timing diagram showing timings of control signals used in the search range pixel value input circuit of FIG. 9.

In the search range pixel value input circuit 108 shown in FIG. 9, each selector circuit transfers the input pixel value that is being supplied from the $R_A$ input terminal 106, if the corresponding control signal F is at the low logic level, and transfers the input pixel value supplied from the $R_B$ input terminal 107, if the corresponding control signal F is at the high logic level. FIG. 14 shows the signal pattern of the control signals F1 to F8 of the search range pixel value input circuit 108. Considering the candidate block 1 of FIG. 11, it can be understood from FIG. 14 that the respective pixel values of that block are supplied to the processors PR(1) to PR(8) in the following manner:

In clock period 1, R(1,1) is supplied to the absolute value subtractor circuit 102 of processor PR(1);
In clock period 2, R(1,2) is supplied to the absolute value subtractor circuit 102 of processor PR(2);
In clock period 3, R(1,3) is supplied to the absolute value subtractor circuit 102 of processor PR(3);
In clock period 4, R(1,4) is supplied to the absolute value subtractor circuit 102 of processor PR(4);
In clock period 5, R(2,1) is supplied to the absolute value subtractor circuit 102 of processor PR(5);
In clock period 6, R(2,2) is supplied to the absolute value subtractor circuit 102 of processor PR(6);
In clock period 7, R(2,3) is supplied to the absolute value subtractor circuit 102 of processor PR(7);
In clock period 8, R(2,4) is supplied to the absolute value subtractor circuit 102 of processor PR(8).

Figure 15:
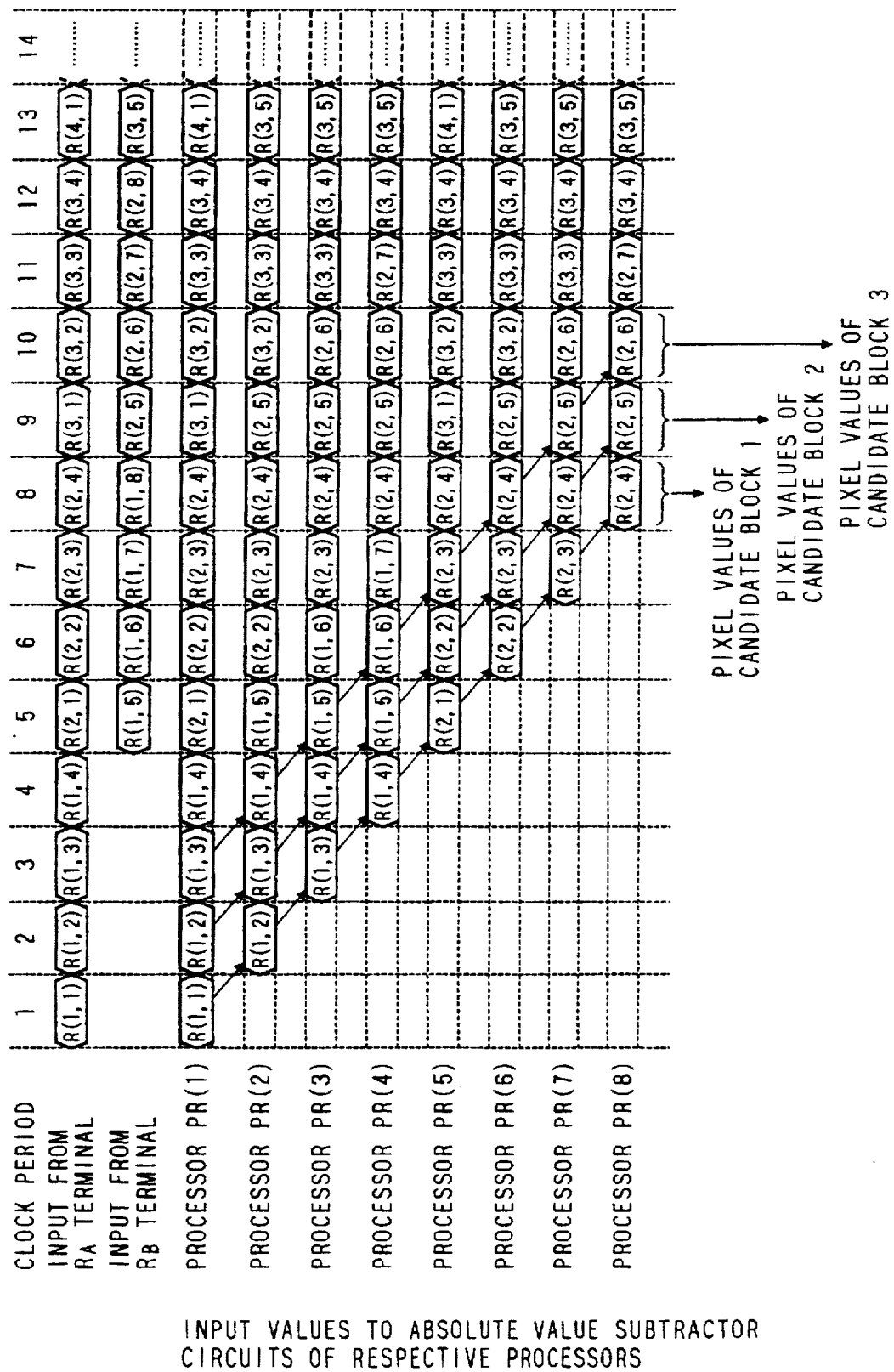
FIG. 15 is a timing diagram showing timings of search range pixel values supplied to absolute value subtractor circuits of respective processors in the circuit of FIG. 7.

It can thus be understood that for example during clock period 1 shown in FIG. 14, the pixel value S(1,1) of the object block and R(1,1) of the candidate block 1 are supplied in parallel to the absolute value subtractor circuit 102 of processor PR(1), and the absolute difference value between these is derived, and supplied to the adder AD(1). FIG. 9 shows the pattern of input pixel values supplied to the input terminals 106, 107 and to the processors PR(1) to PR(8) during successive clock periods designated as 1 to 13. By comparing this diagram with the object block pixel value input pattern shown in FIG. 12, it can be seen that during the clock periods 1 to 8, successive absolute difference values for the pixels R(1,1) to R(2,4) of candidate block 1 are derived by the processors PR(1) to PR(8), and cumulatively added in the cumulative addition circuit 111, to thereby obtain the inter-block error value for candidate block 1 in clock period 8. For example, in clock period 1, the absolute difference value between S1,1 of the object block and R(1,1) of the candidate block 1 is obtained by the absolute value subtractor circuit 102 of processor PR(1), transferred to the adder AD1, and the result set into the B-register RG(1) of the cumulative addition circuit 111. In clock period 2, the absolute difference value between S1,2 and R(1,2) is similarly obtained, added to the value held in register RG(1), and the result set into the B-register RG(2), to be used in a cumulative addition in clock period 3, and so on. That process is illustrated by the arrows extending from clock period 1 to clock period 8 in FIG. 15, to thereby obtain the inter-block error value for candidate block 1.

Similarly, the inter-block error value for candidate block 2 is derived in clock period 9, by operations extending from clock period 2 to clock period 9, then the inter-block error value for candidate block 3 is obtained in clock period 10, and so on. In that way, successive error values for the pixels of a candidate block are derived by sucessive ones of the M×N processors, in successive clock periods.

As the inter-block error values are obtained for the respective candidate blocks, they are successively transferred to the minimum value detection circuit 112. This process continues until the inter-block error value for the final candidate block of the search range has been produced.

In each clock period, the comparator 401 within the minimum value detection circuit 112 compares the inter-block error value that is generated during that clock period with the smallest one of the inter-block error values that have been generated previously (with that smallest inter-block error value being supplied from the minimum value register 402). If the currently generated inter-block error value is smaller than the value supplied from register 402, then the comparator 401 generates a signal designated as the minimum value signal, which is supplied to the minimum value register 402 and to the motion vector value register 404. In that case, the inter-block error value which has been generated in the current clock period is set into the minimum value register 402, while a motion vector value corresponding to the candidate block for which that minimum value has been obtained, derived based on a count of clock periods by a counter 403, is set into the motion vector value register 404. (For simplicity of description, the circuit for deriving such a motion vector value is assumed to be contained in the motion vector value register 404 circuit block).

As a result, when all of the inter-block error values for the candidate blocks within the search range have been supplied to the minimum value detection circuit 112, the required motion vector value for the object block with respect to the search range has been obtained, as the final value held in the motion vector value register 404. That motion vector value (more precisely, the pair of horizontal and vertical components of the motion vector, as described hereinabove) is thereby produced from the motion vector value register 404 at that time, and supplied to an external circuit. The registers 402, 404 are then reset, in preparation for deriving the motion vector for another object block.

It can thus be understood that with the above embodiment of the invention, the object block pixel value input circuit 105 functions such that respective pixel values within the object block are respectively set into the A-registers 101 of the processors PR(1) to PR(M×N), the search range pixel value input circuit 108 functions to supply pixel values within the search range of the reference block to each absolute value subtractor circuit 102 within the processors PR(1) to PR(M×N) such that the absolute difference values between each of the pixels within an candidate block and the corresponding pixels within the object block are sequentially calculated by the processors PR(1) to PR(M×N), and these absolute difference values for a candidate block are cumulatively added within the cumulative addition circuit 111 to thereby obtain an inter-block error value for that candidate block, which is supplied to the minimum value detection circuit 112. These operations are successively executed for each of the candidate blocks within the search range, as illustrated by the timing sequence shown in FIG. 15. The minimum value detection circuit 112 then detects the smallest one of the inter-block error values which have been derived for the various candidate blocks, and thereby obtains the motion vector for the object block within the search range, based on the candidate block for which the minimum inter-block error value has been obtained.

Figure 16:
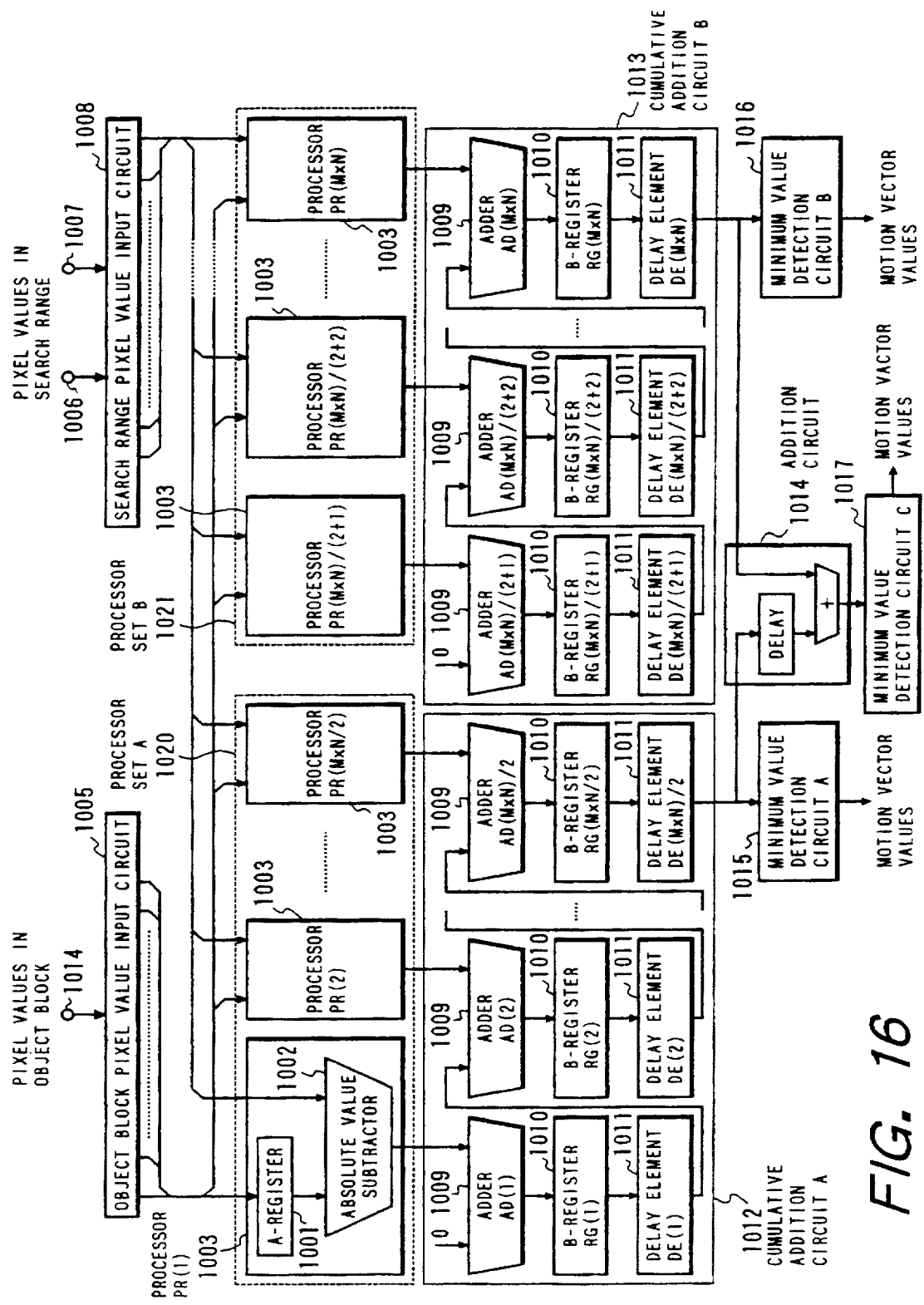
FIG. 16 is a circuit diagram of a motion vector detection circuit of a third embodiment of the invention, applicable to processing a frame-interlace video signal.

A second embodiment of the invention will be described, referring first to the block circuit diagram of FIG. 16. The second embodiment provides a motion vector detection apparatus which provides accurate motion vector detection for the case in which each of successive frames of a video signal is of field-interlace type, i.e. with two sequential fields per frame. Of these, one field will be referred to as field 1 and the other as field 2. The essential features of difference between the embodiment of FIG. 16 and that of FIG. 7 are as follows. Firstly, in place of the cumulative addition circuit 111 of the embodiment of FIG. 7 the embodiment of FIG. 16 utilizes two cumulative addition circuits, i.e. cumulative addition circuit A, denoted by numeral 1012 and cumulative addition circuit B, denoted by numeral 1013. The cumulative addition circuit A derives, for each candidate block, the inter-block error value for the pixel values of that candidate block which lie within field 1 of a frame, and the cumulative addition circuit B derives the inter-block error value for the pixel values of that candidate block which lie within field 2 of the frame. Assuming the object block size to be M×N pixels, (i.e. with (M×N)/2 pixel values in field 1, and the remaining (M×N)/2 pixel values in field 2), a total of M×N processors 1003 are utilized, designated as PR(1) to PR(M× N), with a corresponding total of M×N adders being provided in the A and B cumulative addition circuits 1012, 1013. The processors M×N processors 1003 consist of a processor set A, designated by numeral 1020, which supplies values to the adders 1009 of the cumulative addition circuit A, and a processor set B, designated by numeral 1021, which supplies values to the adders 1009 of the cumulative addition circuit B. The adders 1009 of the cumulative addition circuit 1012 are designated as AD(1) to AD(M×N/2) and those of the cumulative addition circuit B as AD(M×N)/(2+ 1) to AD(M×N), as shown. Output values produced from these adders 1009 are supplied to respective ones of B-registers RG(1) to RG(M×N), designated by numeral 1010. However, as another point of difference between this embodiment and that of FIG. 7, the output values produced from these B-registers are transferred through respective delay circuits DE(1) to DE(M×N), designated by numeral 1011, before being supplied to the succeeding one of the adders AD(1) to AD(M×N) to perform cumulative additions. Each of the delay circuits DE(1) to DE(M×N) provides a delay of one clock period. Thus each of the A and B cumulative addition circuits is formed of a set of (M×N)/2 cascaded circuit sections, each circuit section consisting of an adder 1009 coupled to receive absolute difference values from a processor 1003, a B-register 1001 for temporarily holding an output value produced from the adder 1009, and a delay element 1011 for delaying the output value produced from the B-register 1001.

The inter-block error values produced from the cumulative addition circuits 1012, 1013., obtained for the field 1 and the field 2 pixels of a candidate block respectively, are combined in an addition circuit 1014, to thereby obtain a combined inter-block error value for that candidate block over the two fields of a frame. The combined inter-block error values for the various candidate blocks of the search range are supplied to a minimum value detection circuit 1017, for detecting the motion vector of the object block as described hereinabove for the minimum value detection circuit of the first embodiment.

The inter-block error values produced from the cumulative addition circuit 1012 can if desired be supplied to a minimum value detection circuit 1015 which, for each candidate block, detects the motion vector value for the pixels of that candidate block which are within field 1, while the inter-block error values produced from the cumulative addition circuit 1013 can similarly be supplied to a minimum value detection circuit 1016 which detects the motion vector value for the pixels of that candidate block which are within field 2.

The operation of this embodiment will be described more specifically, again assuming that the object block dimensions are M=2, N=4, i.e. the object block is a 2×4 array of 8 pixels, of the form shown in FIG. 11, and that the search range of the reference frame (i.e. of the combination of two fields which constitute the reference frame) is also as shown in FIG. 11 and described above for the first embodiment. Hence in this case the apparatus of FIG. 16 has a total of eight processors 1003, i.e. the A processor set 1020 consists of processors PR(1) to PR(4), and the cumulative addition circuits 1012, 1013 each have four adders 1009 (i.e. adders AD(1) to AD(4) and AD(5) to AD(8) respectively), with their associated B-registers 1010 and delay elements 1011. The output values from these processors 1003 are supplied to respective ones of the adders 1009 of the cumulative addition circuit 1012 in the same manner as described for the embodiment of FIG. 7. Similarly, the B processor set 1021 consists of the four processors PR(5) to PR(8), whose output values are supplied to corresponding adders 1009 of the cumulative addition circuit B.

Figure 17:
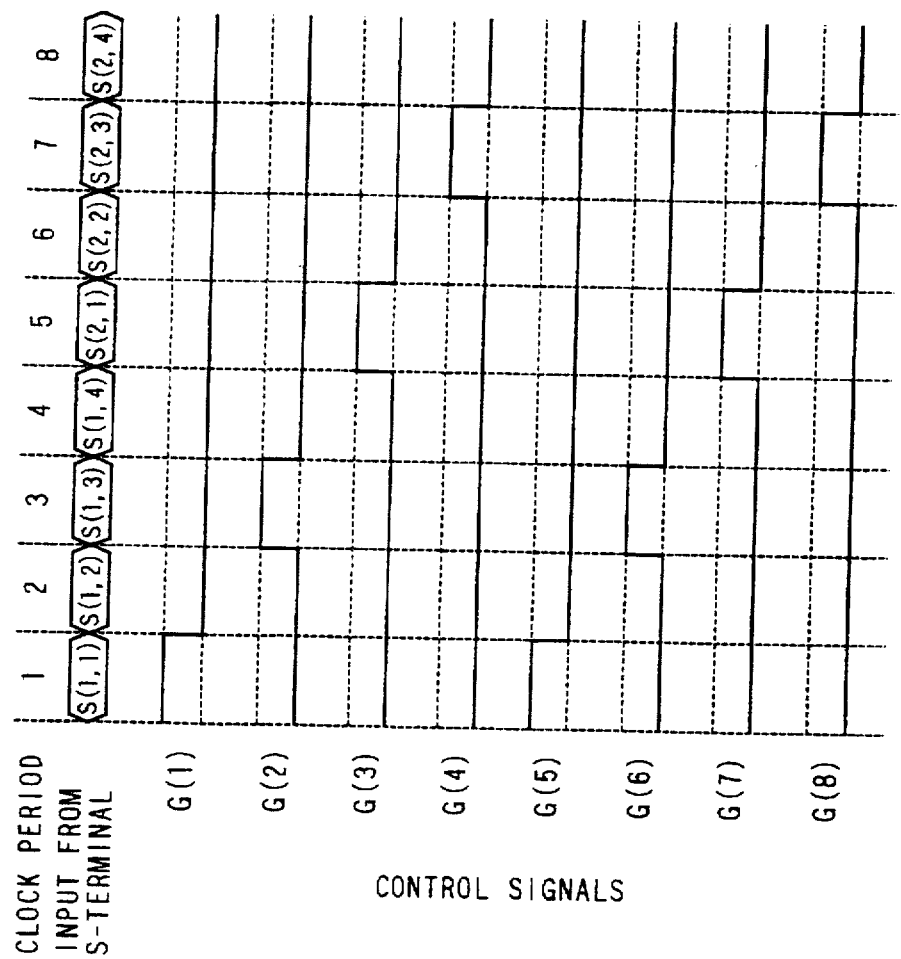
FIG. 17 is a timing diagram showing timings of control signals used in an object block pixel value input circuit of FIG. 16.
Figure 18:
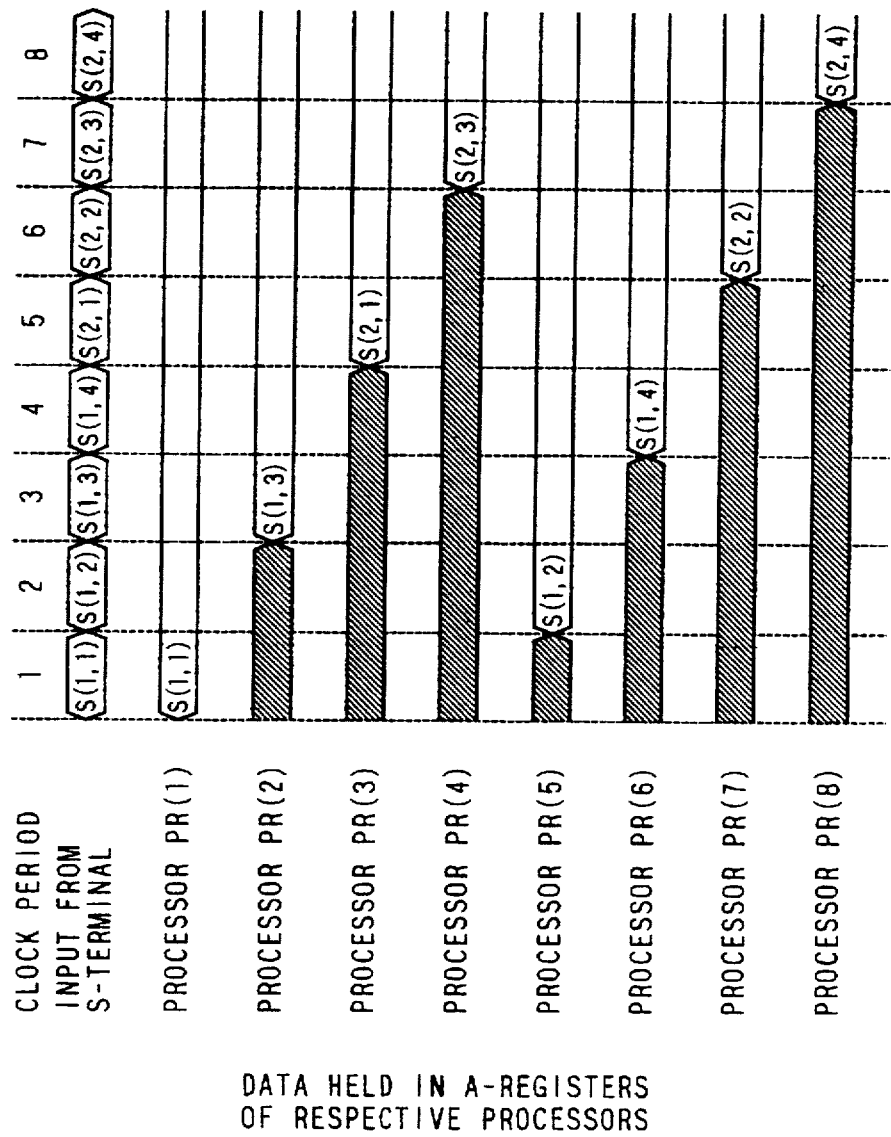
FIG. 18 is a timing diagram showing timings of setting object block pixel values into respective processors in the circuit of FIG. 16.

It will be assumed that the pixel values S(1,1), S(1,3), S(2,1), S(2,3) of the object block (shown in FIG. 11) occur in field 1 of the object frame, and that the pixel values S(1,2), S(1,4), S(2,2), S(2,4) of the object block occur in field 2 of the object frame. The internal configuration of the object block pixel value input circuit 1005 of this embodiment is identical to that of the object block pixel value input circuit 105 of the first embodiment, shown in FIG. 8. However the control signals G1 to G8 of this embodiment are generated from the ROM 202 within the object block pixel value input circuit 1005 as shown in FIG. 17. As a result, the selecting operations performed by the object block pixel value input circuit 1005 are as illustrated in FIG. 18. As shown, the object block pixel values are sequentially selected to be supplied to the A-registers 101 of the respective processors PR(1), to PR(4) which are coupled to the cumulative addition circuit 1012 with successive delays of two clock periods, so that pixel value S(1,1) is produced from the A-register of processor PR(1) in clock period 1 in FIG. 18, pixel value S(1,3) is produced from the A-register of processor PR2 in clock period 3, pixel value S(2,1) is produced from the A-register of processor PR3 in clock period 7, and pixel value S(2,3) is produced from the A-register of processor PR(4) in clock period 7.

Similarly, the object block pixel values are sequentially selected to be supplied to the A-registers 101 of the respective processors PR(5) to PR(8) which are coupled to the cumulative addition circuit 1013 with successive delays of two clock periods, so that pixel value S(1,2) is produced from the A-register of processor PR(5) in clock period 2, pixel value S(1,4) is produced from the A-register of processor PR6 in clock period 4, pixel value S(2,2) is produced from the A-register of processor PR7 in clock period 6, and pixel value S(2,4) is produced from the A-register of processor PR(8) in clock period 8.

Thus there is a one-clock period delay between the sequence of pixel values supplied to to the processor set A and the sequence of pixel values supplied to the processor set B.

Figure 19:
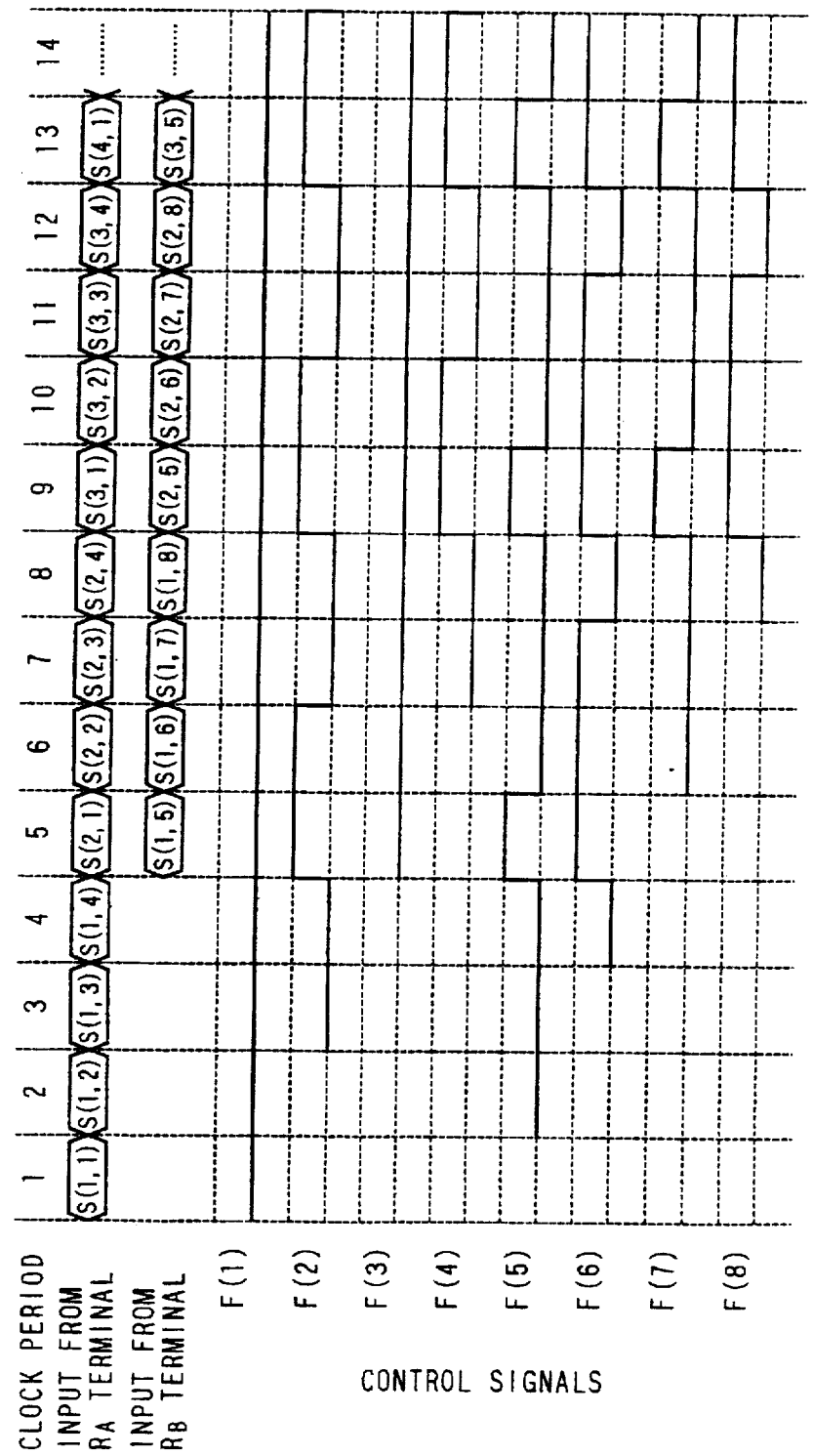
FIG. 19 is a timing diagram showing timings of control signals used in a search range pixel value input circuit used in the circuit of FIG. 16.
Figure 20:
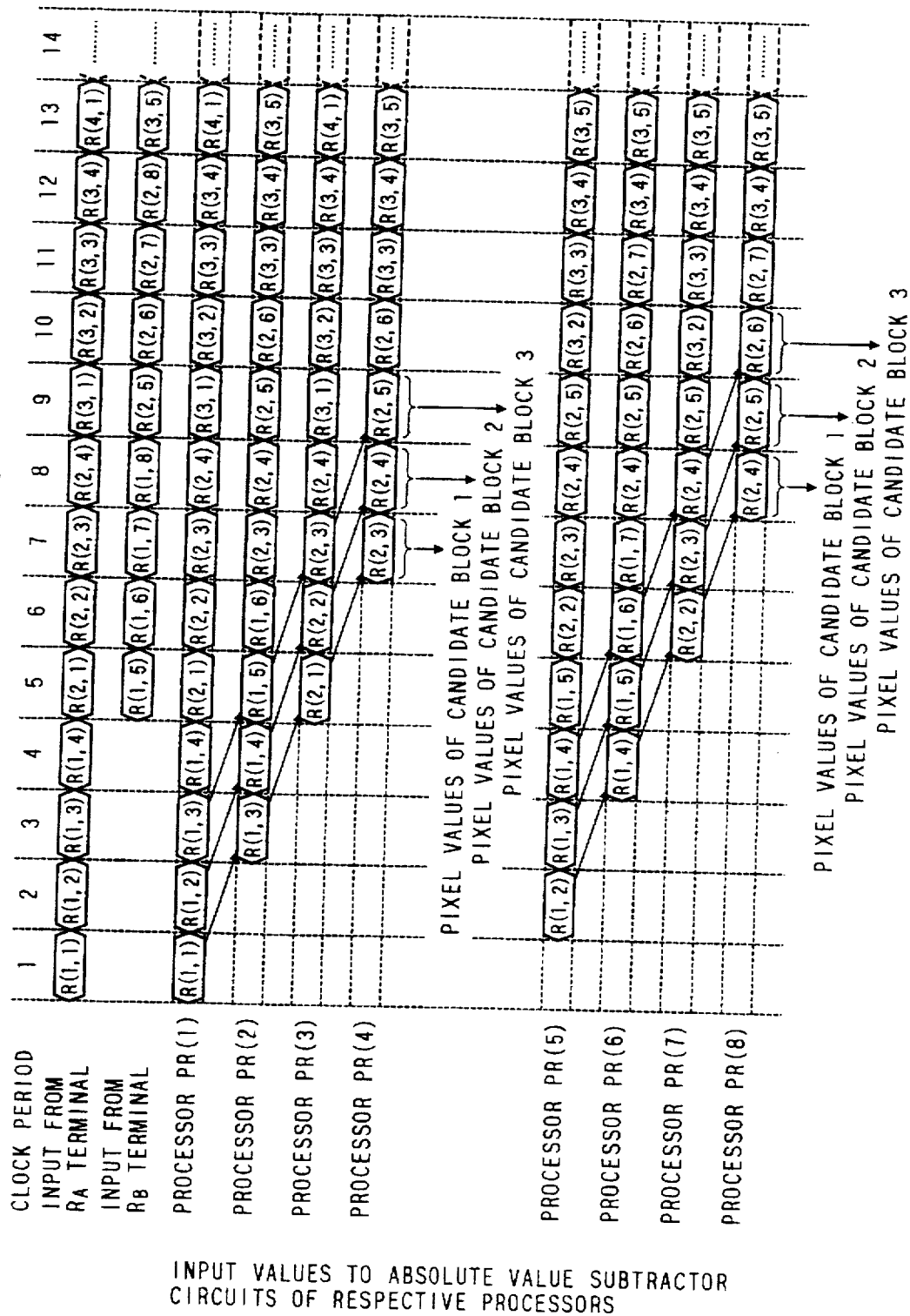
FIG. 20 is a timing diagram showing timings of search range pixel values supplied to absolute value subtractor circuits of respective processors in the circuit of FIG. 16.

The search range pixel value input circuit 1008 of this embodiment is of identical configuration to that of the first embodiment, described above referring to FIG. 9. In addition, the respective sequences of search range pixel values R(1,1) etc. which are supplied to the Ra and Rb input terminals 1006 and 1007 of the search range pixel value input circuit 1008 are identical to those for the search range pixel value input circuit 108 of the first embodiment. However the control signals F1 to F8 generated in the second embodiment are as shown in FIG. 19. As a result, the pixel values of the search range are selected by the search range pixel value input circuit 1008 to be transferred to the absolute value subtractors 1002 of the A and B sets of processors PR(1) to PR(4) and PR(5) to PR(8) are as shown in FIG. 20. For each of these two sets of processors, there is a delay of two clock periods between the start of supplying successive search range pixel values to a processor and the start of supplying successive search range pixel values to the next processor of the set. In addition, there is a one-clock period delay between the start of supplying successive pixel values of the search range to the set of processors PR(1) to PR(4) and the start of supplying successive pixel values of the search range to the set of processors PR(5) to PR(8).

As can be understood from the signal timing relationships in FIGS. 18 and 20, the set of processors PR(1) to PR(5) will derive successive inter-block error values for the pixel values S(1,1), S(1,3), S(2,1), S(2,3) of the object block, (i.e. the pixel values which occur in field 1 of the object frame) with respect to successive candidate blocks within the search range, but with each of these candidate blocks being formed of four pixel values. That is to say, each of these "candidate blocks" consists of half of the total number of pixel values which constitute a candidate block, i.e. the pixel values of that block which occur in field 1 of the reference frame. In that way, considering the candidate block 1 shown in FIG. 11, cumulative values of absolute error are obtained with respect to that candidate block by the cumulative addition circuit 1012 in the clock periods 1, 3, 5 and 7 (i.e. for the object block pixel values S(1,1), S(1,3), S(2,1), S(2,3) of field 1 of the object frame respectively), with an inter-block error value for that candidate block with respect to field 1 being thereby outputted from the cumulative addition circuit 1012 in clock period 7. Similarly, cumulative values of absolute error are obtained with respect to candidate block 1 by the cumulative addition circuit 1013 in the clock periods 2, 4, 6 and 8 (for the object block pixel values S(1,2), S(1,4), S(2,2), S(2,4) of field 2 of the object frame), with an inter-block error value for that candidate block with respect to field 2 being thereby outputted from the cumulative addition circuit 1013 in clock period 8.

By delaying the error value thereby obtained by the cumulative addition circuit 1012 for candidate block 1 by one clock period, and adding the value to the error value obtained by the cumulative addition circuit 1013 for candidate block 1, a combined inter-block error value for candidate block 1 is thereby produced from the addition circuit 1014. In a similar manner, successive combined inter-block error values are obtained for all of the other candidate blocks within the search range of the reference frame. These are supplied to the minimum value detection circuit 1017, which thereby obtains the required motion vector in the same way as described for the preceding embodiment. Alternatively, separate motion vectors with respect to field 1 and field 2 can be derived by the minimum value detection circuits 1015 and 1016.

It can thus be understood that the second embodiment of the invention enables similar results to be obtained to those of the first embodiment, but is applicable to accurately obtaining motion vector values when processing field-interlace video data.

Figure 21:
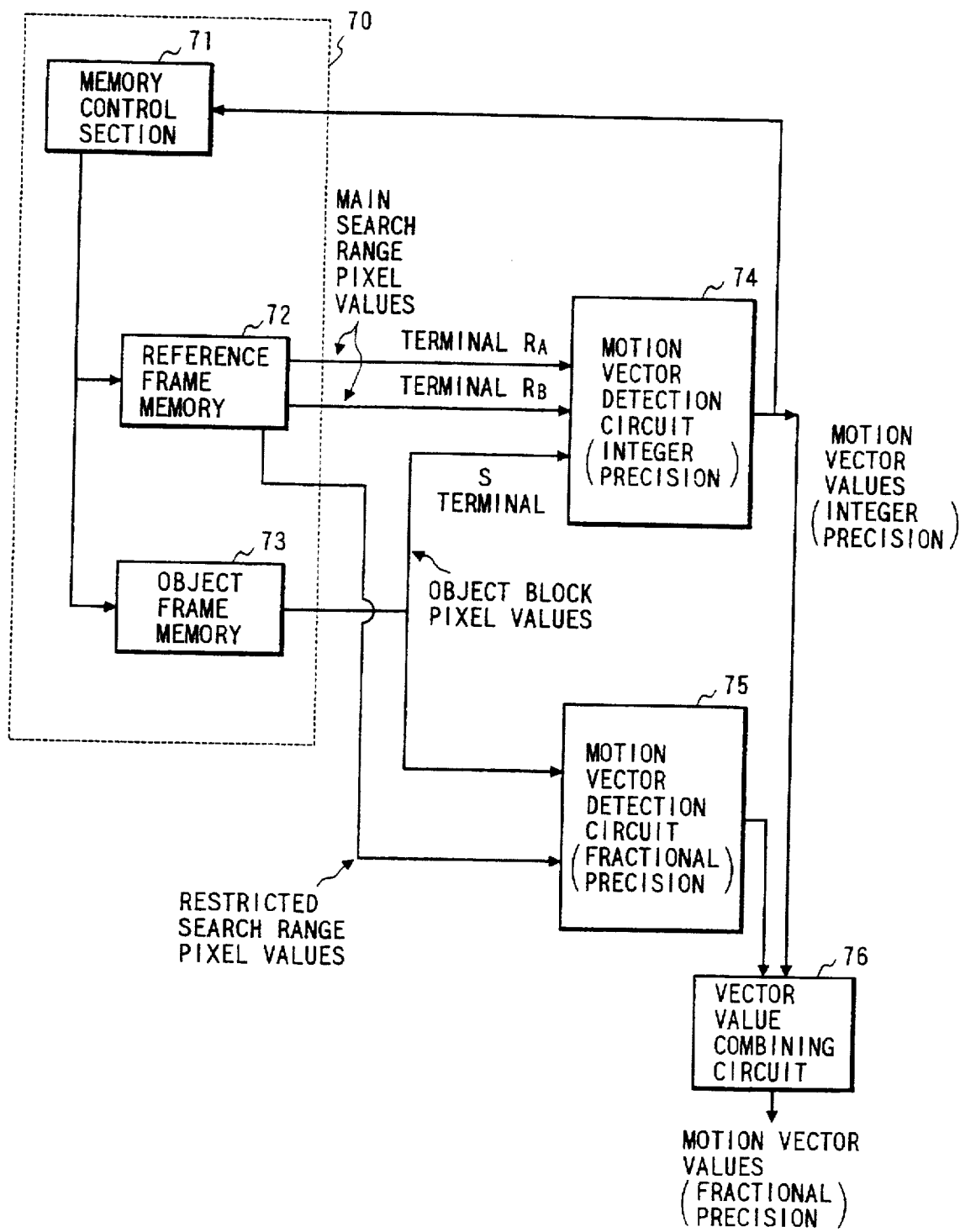
FIG. 21 is a general block diagram showing the basic configuration of a second embodiment of a motion vector detection apparatus according to the present invention, for providing fractional precision detection.
Figure 24:
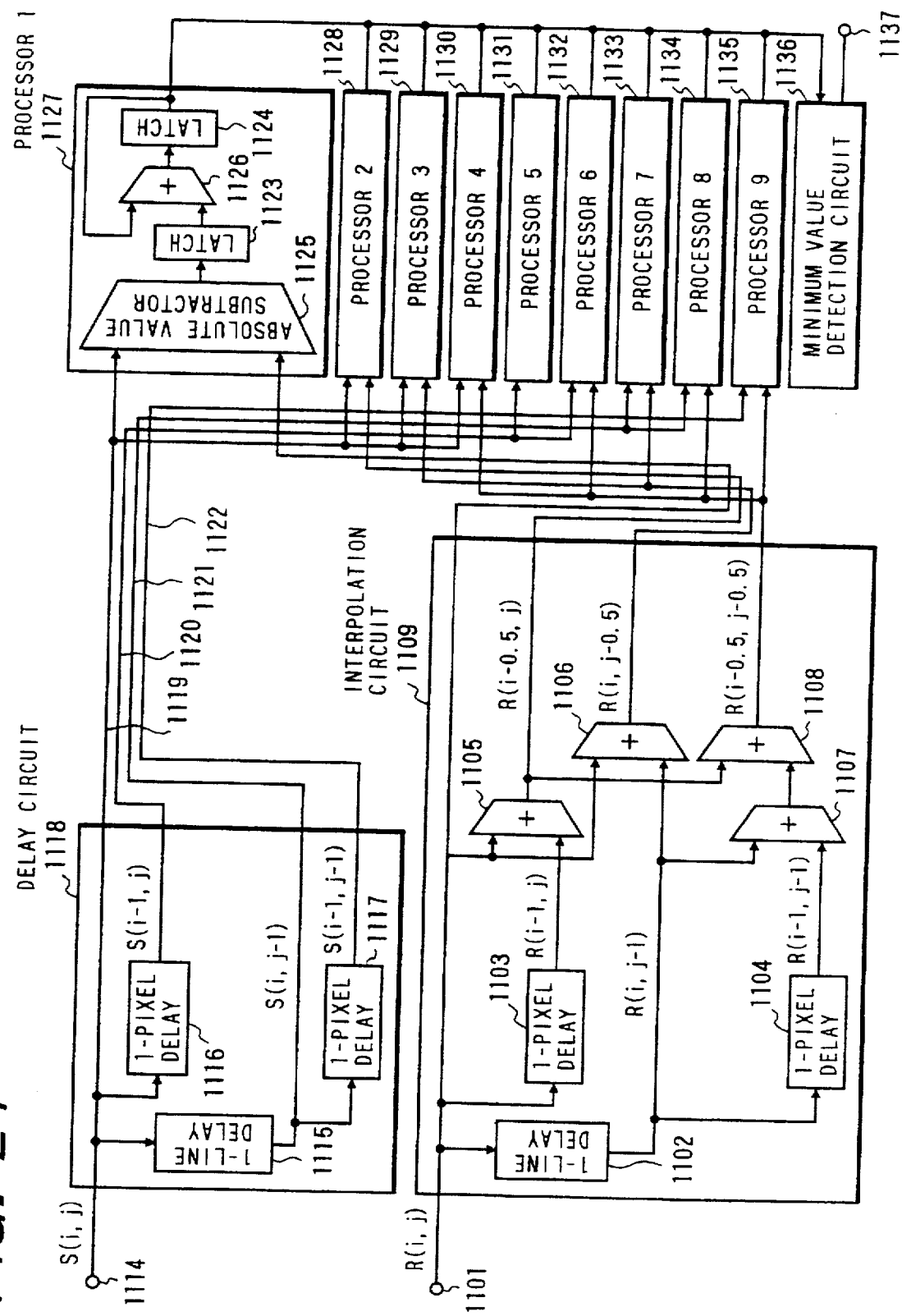
FIG. 24 is a circuit diagram of a fractional precision motion vector detection circuit of the third embodiment.

FIG. 21 is a general overall block diagram of an embodiment of the invention which is a motion vector detection apparatus for providing fractional precision accuracy of motion vector detection. FIG. 24 is a block circuit diagram of a fractional precision motion vector detection circuit of this embodiment. In FIG. 21, within a memory device 70, a memory control section 71 controls read-out of data from a reference frame memory 72 and a object frame memory 73. As described hereinabove for the preceding embodiments, the reference frame memory 72 holds a first video signal frame expressed as an array of pixels, referred to as the reference frame, while the object frame memory 73 holds a second video signal frame, referred to as the object frame. Pixel values from the reference frame memory 72 and object frame memory 73 are supplied, in respective specific sequences predetermined by the memory control section 71, to a motion vector detection circuit 74 which provides integer precision detection (i.e. which detects an optimum correlation candidate block with pixel-unit accuracy, as mentioned hereinabove) and to a motion vector detection circuit 75 which provides fractional precision detection. The integer precision motion vector detection circuit 75 can for example be of in accordance with either of the preceding embodiments of the invention described above, or may be some other type of integer precision motion vector detection circuit.

The basic operation of this apparatus is as follows, assuming that the object block size is 3×3 pixels, i.e. being configured as shown in FIG. 22. For each object block, integer precision motion vector information is first derived by the motion vector detection circuit 75, i.e. information which defines an optimum correlation candidate block within the main search range of the reference frame. That information is then supplied to the memory control section 71. The memory control section 71 then controls the reference frame memory 72 to read out the pixel values of the restricted search range, which are shown in FIG. 23. In FIG. 23, the pixel values of the corresponding candidate block are designated as the 3×3 set of values R(0,0) to R(2,2). As shown, the search range pixel values consist of the object block values and those of a set of pixels which are adjacent to and surround the object block R(0,0) to R(2,2).

As the pixel values of the restricted search range are being read out from the object frame memory 73 in a specific sequence as described hereinafter and supplied to the motion vector detection circuit 75, pixel values of the object block are read out from the reference frame memory 72 and also supplied to the motion vector detection circuit 75. When a fractional precision motion vector with respect to the restricted search range has been derived for the object block by the motion vector detection circuit 75, the components of that motion vector are combined with the components of the integer precision motion vector derived for that object block by the motion vector detection circuit 74, in a combining circuit 76, to thereby obtain a motion vector having fractional precision with respect to the main search range.

In the following description of the fractional precision motion vector detection circuit 75, referring to the block circuit diagram of FIG. 24, the embodiment will be assumed to provide ½ pixel precision, and be applicable to an object block of size 3×3 pixels. In FIG. 24, sequential pixel values within the restricted search range are supplied, in respective clock periods, via an input terminal 1101 to a 1-line delay element 1102 within an interpolation circuit 1109. The output pixel values from the 1-line delay element 1102, each delayed by one line period, are supplied to a 1-pixel delay element 1104, while the direct input pixel values from input terminal 1101 are supplied to a 1-pixel delay element 1103. Here the term "one line period" signifies the time for which one row of restricted search range pixel values pixel values are supplied to input terminal 1101, while a "1-pixel delay element" provides a delay of one clock period. The delayed pixel values from the delay elements 1103 and the direct input pixel values from input terminal 1101 are supplied to respective inputs of an adder 1105, the output pixel values from the 1-line delay element 1102 and from the 1-pixel delay element 1104 are supplied to an adder 1107, while the output pixel values from the 1-line delay element 1102 are also supplied to one input of an adder 1106, together with the direct input pixel values from the input terminal 1101. Although not indicated in the drawing, each of the adders 1105, 1106, 1107 and 1108 in the interpolation circuit 1109 is combined with a factor multiplying function, whereby each of the two input values supplied to an adder is multiplied by a fixed factor having a value less than 1. In this embodiment that factor is ½, for each of the input values supplied to an adder.

The respective outputs from the adders 1105 and 1107 are supplied to the adder 1108.

1110, 1111, 1112 and 1113 denote respective buses, referred to in the following as the R1 bus, the R2 bus, R3 bus and the R4 bus, which respectively transfer the direct values from the input terminal 1101, the output pixel values from adder 1105, output pixel values from adder 1106, and output pixel values from adder 1108.

Successive pixel values S(i,j) of the object block are supplied via an input terminal 1114 to a delay circuit 1118. Within the delay circuit 1118, these pixel values are first supplied to a 1-line delay element 1115, and the delayed output pixel values from the delay element 1115 are supplied to a 1-pixel delay element 1117. The directly inputted pixel values from input terminal 1114 are also supplied to a 1-pixel delay element 1116. The directly supplied pixel values S(i,j) from input terminal 1114 are transferred to a bus 1119, the delayed pixel values from the 1-pixel delay element 1116 transferred to a bus 1120, the delayed pixel values produced from the 1-line delay element 1115 transferred to a bus 1121, and the output pixel values from the 1-pixel delay element 1117 are transferred to a bus 1122. The buses 1119, 1120, 1121 and 1122 are respectively referred to as the S1, S2, S3 and S4 buses.

A processing circuit, referred to in the following as the No. 1 processor 1127, is formed of a absolute value subtractor circuit 1125, a latch 1123 which temporarily holds each output value produced from the absolute value subtractor circuit 1125, an adder 1126 which receives as one input the output value produced from the latch 1123, and a second latch 1126 which temporarily holds each output value produced from the adder 1126, with the output value from the latch 1126 being fed back to a second input of the adder 1126. The absolute value subtractor circuit 1125 calculates the absolute difference value between each pair of values which appear on the S1 bus 1119 and the R1 bus 1110 in each clock period, with that absolute value being set into the latch 1123. The latches 1123, 1124 in conjunction with the adder 1126 constitute a cumulative addition circuit, for obtaining the cumulative sum of absolute difference values produced by the absolute value subtractor circuit 1125, i.e. an inter-block error value. Since the processor 1127 receives the non-delayed values which are supplied to input terminals 1101 and 1114, that processor derives the inter-block error value for the first candidate block within the restricted search region, shown as the set of values R(0,0) to R(2,2) within the dark-line rectangle in FIG. 23.

Eight other processors are provided as shown, designated by numerals 1128 to 1135, and referred to as the No. 2 to No. 9 processors. Each of these is of identical configuration to the No. 1 processor 1127, with the total number of processors being equal to the number of candidate blocks defined within the restricted search region. In this case, since ½ pixel precision is achieved, there is a total number of 9 candidate blocks.

A minimum value detection circuit 1136 receives respective cumulative sum values which are currently held in the respective latches 1124 of the No. 1 to No. 9 processors 1127 to 1135, and detects the smallest of these cumulative sum values, to thereby obtain motion vector data which are supplied to an output terminal 1137.

The timings of supplying the search range pixel values R(i,j) and of supplying the object block pixel values S(i,j) are as shown in the appended table which is divided into two consecutive parts, labelled Tables 2A, 2B respectively. As shown in Tables 2A, 2B, referring to the table column for the input terminal 1101, the pixel values within the search range are supplied in respective clock periods in the sequence R(-1,-1), R(0,-1), R(1,-1), R(2,-1), R(3,-1), R(1,0),R(0, 0), R(1,0), R(2,0), R(-3,0) . . . R(3,3), to the interpolation circuit 1109. As each of these pixel values is supplied to the interpolation circuit 1109, the pixel value which was supplied one line previously, and the pixel value which was supplied (one line period+one clock period) previously, are respectively obtained, together the pixel value which was supplied one clock period previously. Here, "one line period" signifies a number of clock periods equal to the number of pixels in one row of the restricted search range, i.e. five clock periods in this embodiment. Thus with respect to the current pixel value that is being supplied to the interpolation circuit 1109, the values for a pixel in the same line (i.e. row) as the current pixel but in the immediately preceding column, a pixel in the immediately preceding line but in the same column as the current pixel, and for a pixel which is in the preceding line and preceding column with respect to the current pixel (i.e. which is vertically immediately above and horizontally immediately adjacent to the left of the current pixel, assuming top-to bottom and left-to-right frame scanning directions). Thus designating the current pixel value as R(i,j), these three other pixel values which are obtained from the delay elements 1103, 1102 and 1104 respectively, are designated as R(i−1,j), R(i,j−1) and R(i−1,j−1) respectively. The sum of the pixel values R(i,j) and R(i−1,j) is obtained by the adder 1105, which also functions to divide the resultant sum by 2 (due to the aforementioned fractional factor by which the input values to the adder are multiplied) thereby obtaining the interpolated value R(i−0.5,j). Similarly, the adder 1106 obtains the sum R(i,j)+R(i,j−1) and divides that by 2, to obtain the interpolated value R(i,j−0.5). The adder 1107 obtains the sum R(i,j−1)+R(i−1,j−1). The adder 1108 receives the respective sum values obtained from the adders 1105 and 1107, and so obtains an output value that is equivalent to:

$$\{R(i,j)+R(i-1,j)+R(i,j-1)+R(i-1,j-1)\}/4$$

i.e. obtains the interpolated value R(i−0.5,j−0.5).

The directly supplied values R(i,j) from the input terminal 1101 are transferred to the R1 bus 1110, while the interpolated values R(i−0.5,j), R(i,j−0.5) and R(i−0.5,j−0.5) are supplied to R2 bus 1111, the R3 bus 1112 and the R4 bus 1113 respectively. As a result, the values shown in the corresponding columns of Tables 2A, 2B successively occur on these buses R1 to R4 in the sequences shown in the respective columns, at the timings shown in the tables.

The pixel values S(0,0), S(0,1), S(0,2), S(1,0), S(1,1), S(1,2), S(2,0), S(2,1), S(2,2) for the object block are supplied to the input terminal 1114 at the clock period timings shown in the corresponding column of Tables 2A, 2B. In the same manner as described above for the search range pixel values R(i,j), the 1-pixel delay element 1116, the 1-line delay element 1115 and the 1-pixel delay element 1117 of the delay circuit 1118 respectively output, in each clock period, pixel values which can be designated as S(i−1,j), S(i,j−1) and S(i−1,j−1), and which have respectively identical position and timing relationships within a frame, to the current object block pixel value S(i,j) that is being supplied to the input terminal 1114, as the position and timing relationships described above between the current search range pixel value R(i,j) and the pixel values R(i−1,j), R(i,j−1) and R(i−1,j−1), i.e. displaced by one pixel position vertically, to the preceding line, displaced by one pixel position horizontally, to the preceding column and displaced by one pixel position in each of the vertical and horizontal directions, to the preceding line and preceding column.

The directly supplied pixel values S(i,j) from input terminal 1114, and the delayed pixel values S(i−1,j), S(i,j−1) and S(i−1,j−1), are supplied to the S1 bus 1110, the S2 bus 1120, the S3 bus 1121 and the S4 bus 1122, respectively. As a result, the values shown in the corresponding columns in Tables 2A, 2B for the buses S1 to S4 occur on these buses at the clock period timings shown in the tables.

The following pipeline operations are executed by the No. 1 processor 1127. In each clock period in which corresponding pixel values R(i,j) and S(i,j) (for example, R(0,0) and S(0,0) in clock period 6 in Tables 2A,2B) are being supplied via buses 1110 and 1119, the absolute value subtractor circuit 1125 calculates the absolute value |R(i,j)−S(i,j)| of the difference between these pixel values, and sets that absolute value into the latch 1123. The absolute difference values thus obtained are successively added to obtain a cumulative sum, as an inter-block error value $D_{0,0}$, which is then set into the latch 1124.

Figure 1:
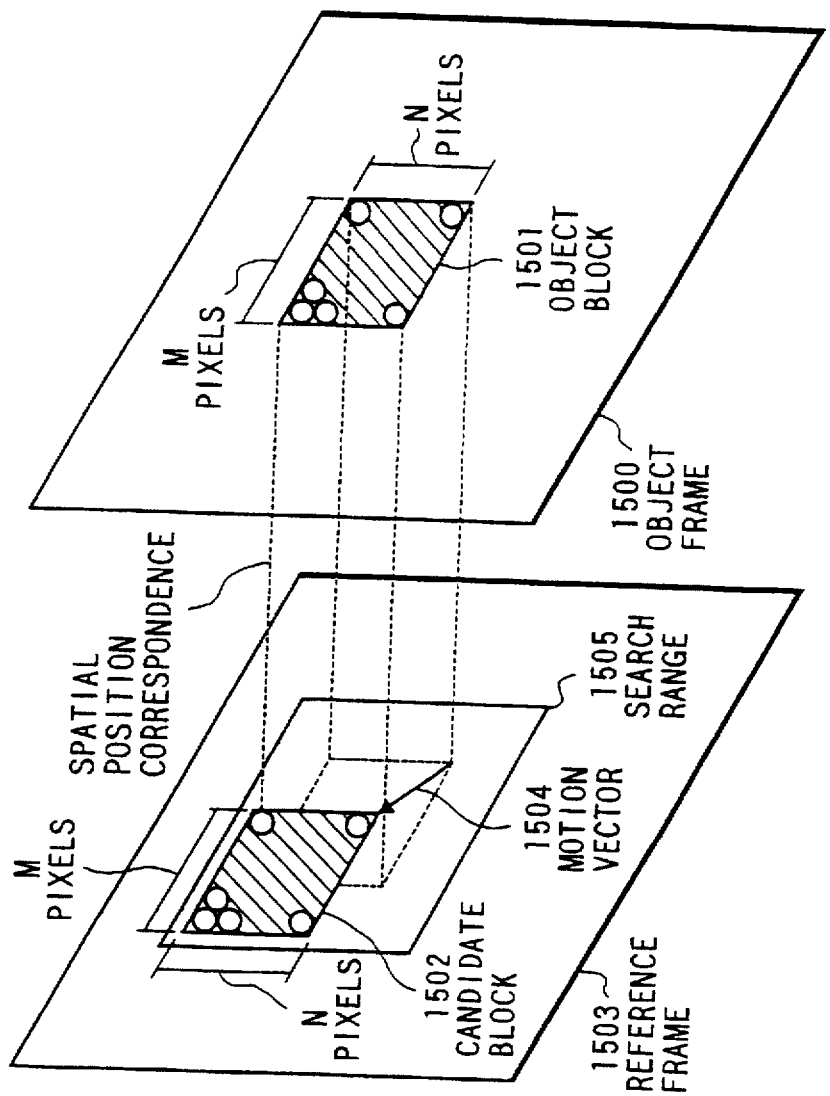
FIG. 1 is a conceptual diagram for illustrating spatial relationships between an object block in an object frame and a search range within a reference frame.
Figure 2:
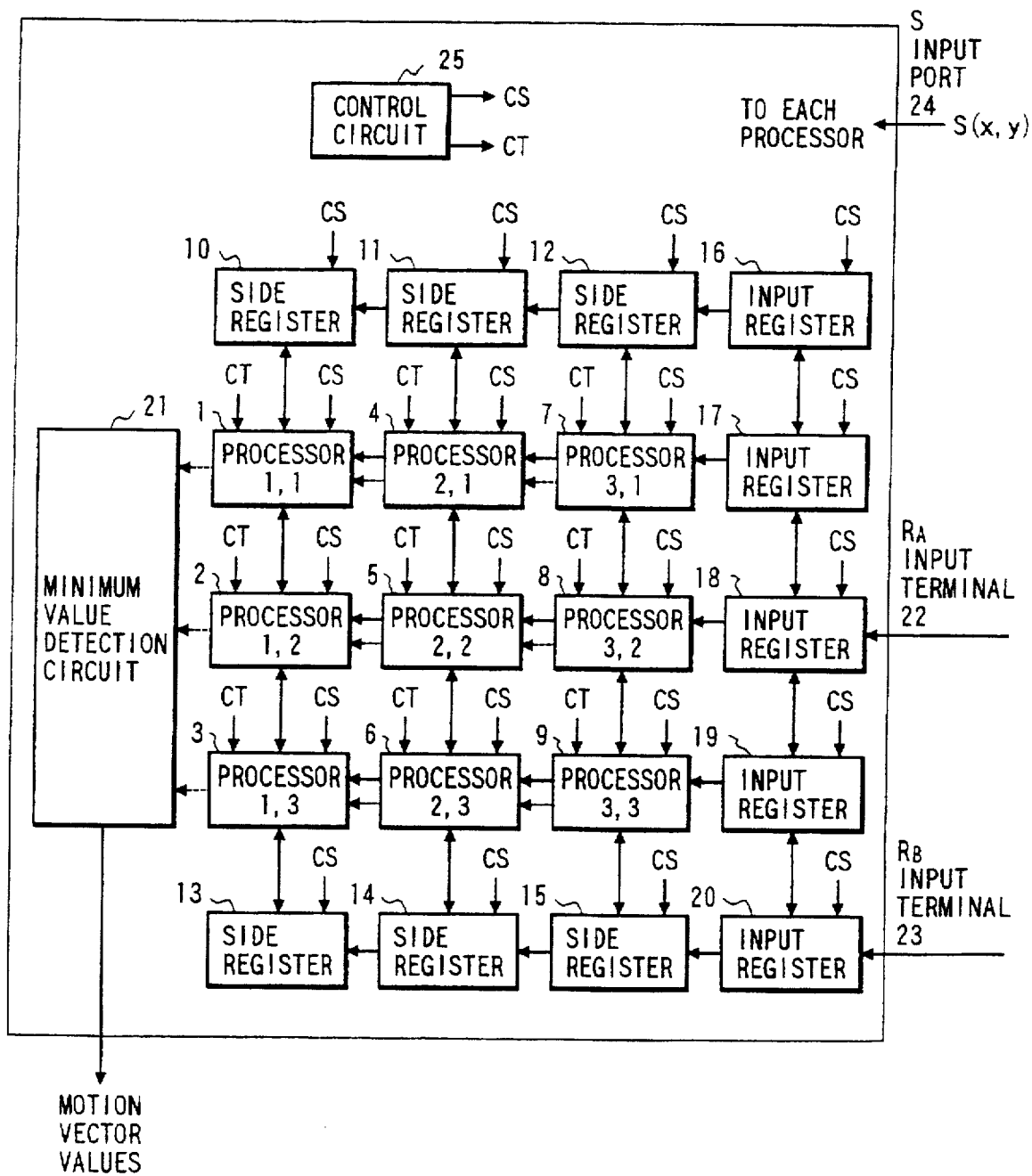
FIG. 2 is a general block circuit diagram of a prior art motion vector detection apparatus.
Figure 3:
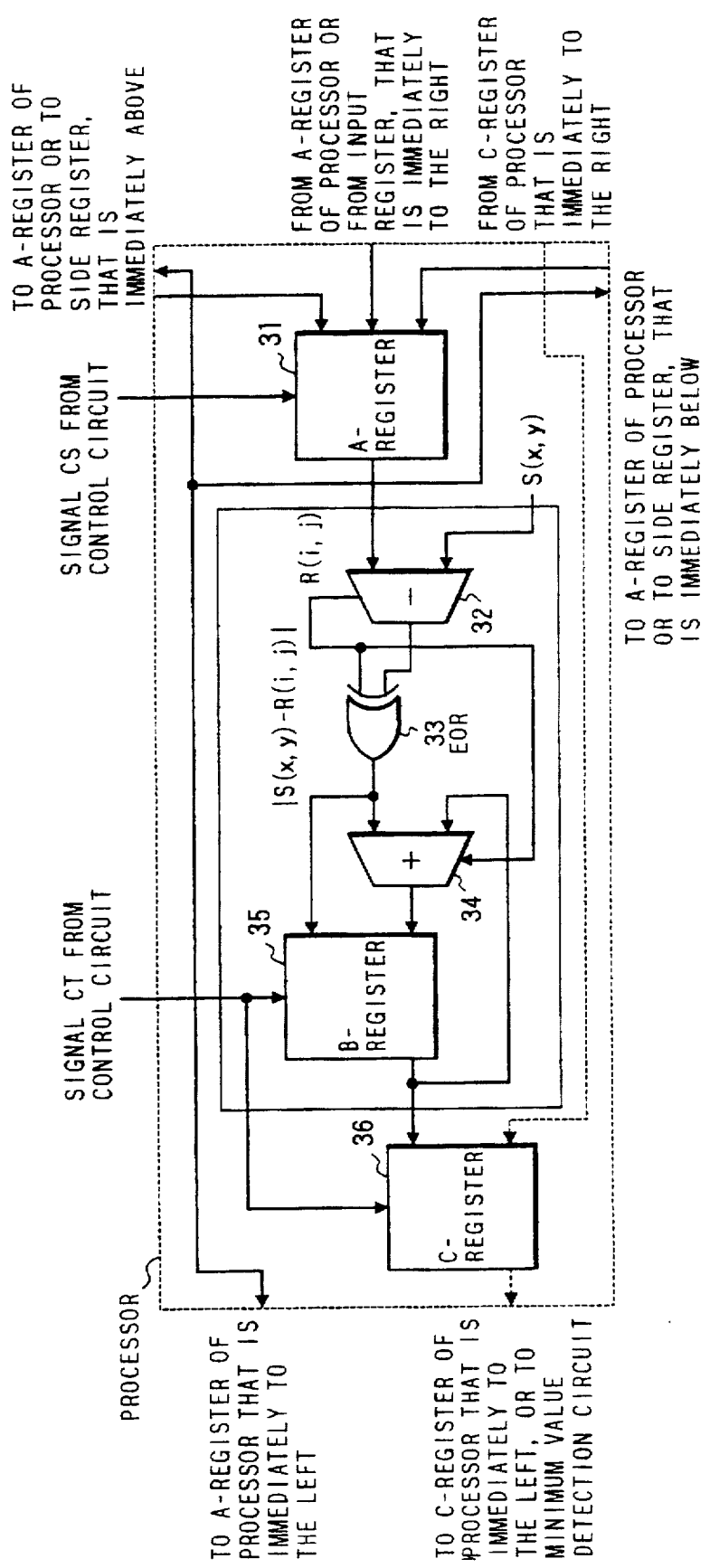
FIG. 3 is a circuit diagram of a processor utilized in the motion vector detection apparatus of FIG. 2.
Figure 4:
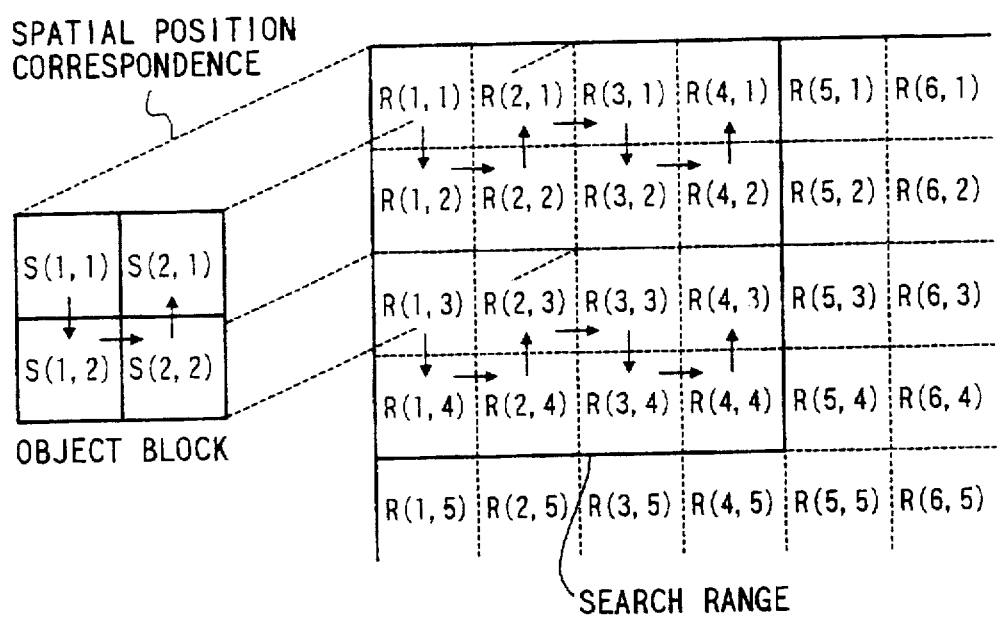
FIG. 4 is a conceptual diagram showing an object block in relation to a search range, for use in describing the operation of the prior art motion vector detection apparatus of FIG. 2.
Figure 5:
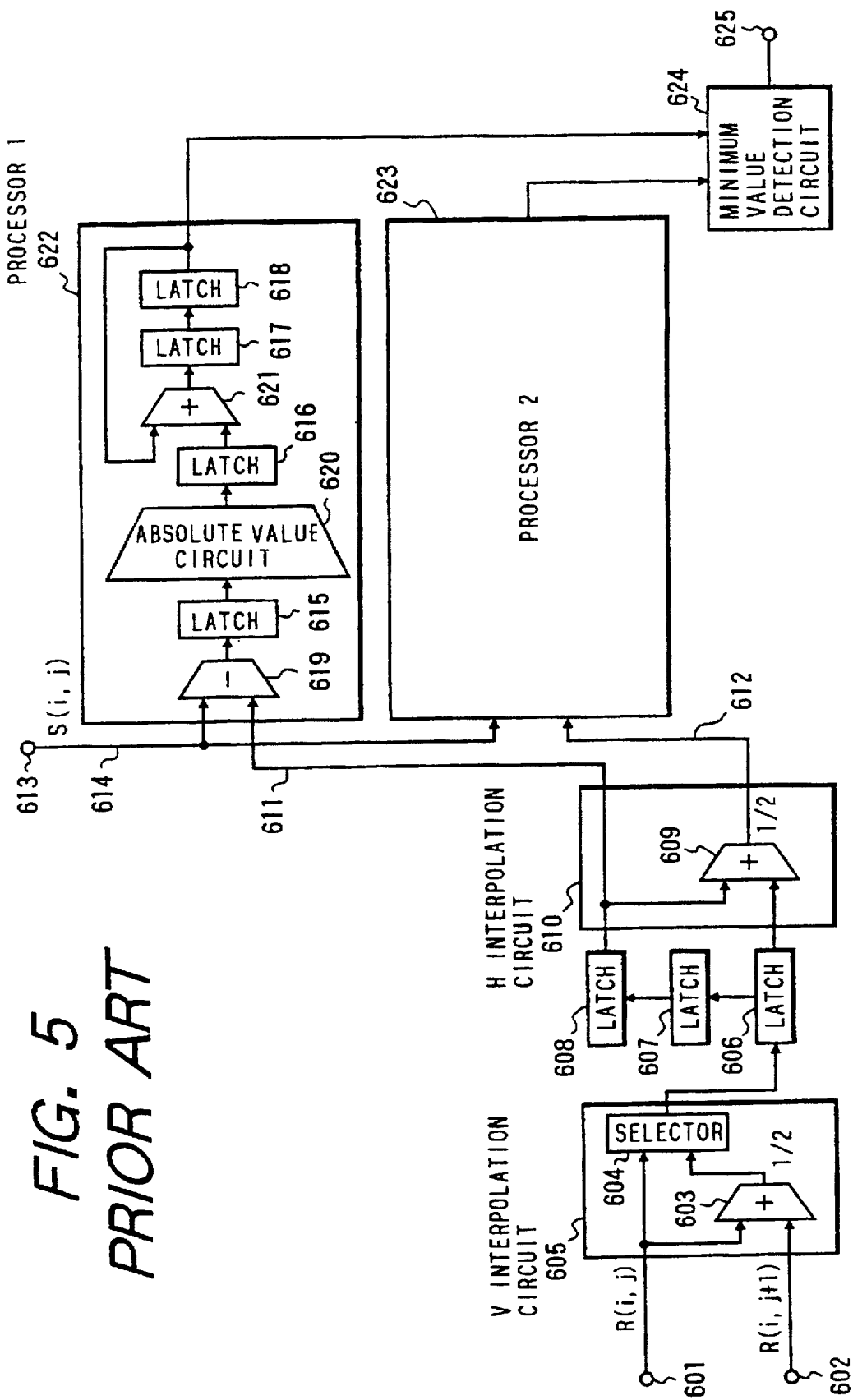
FIG. 5 is a general block circuit diagram of a fractional precision motion vector detection subcircuit, utilized in another example of a prior art motion vector detection apparatus.

Each of the No. 2 to No. 9 processors 1128 to 1135 has the same configuration as the processor 1127, however due to the respectively combinations of pairs of the buses S1 to S4 and R1 to R4 which are connected to the processors as shown in FIG. 1, the respective inter-block error values shown in the appended Table 3 are derived by the No. 1 to No. 9 processors 1127 to 1135. The 9 inter-block error values shown in Table 3, which have thus been obtained for the object block with respect to the search range, are supplied to the output terminal 1137, to find the smallest of these inter-block error values. The inter-block error values can be designated in general as $D_{k,l}$ where k and l take values in the range −0.5, 0, 0.5, and the smallest of the inter-block error values as $D_{x,y}$. It can thus be understood that the values x and y for that smallest inter-block error value constitute the horizontal and vertical displacement components of the motion vector with respect to the restricted search range, i.e. respective values of horizontal and vertical displacement between the object block and the candidate block (defined by interpolated values within the restricted search range). That is to say, x and y express a fractional precision motion vector for the object block, within the restricted search range that is expressed by the values R(i,j) supplied to input terminal 1101.

Figure 25:
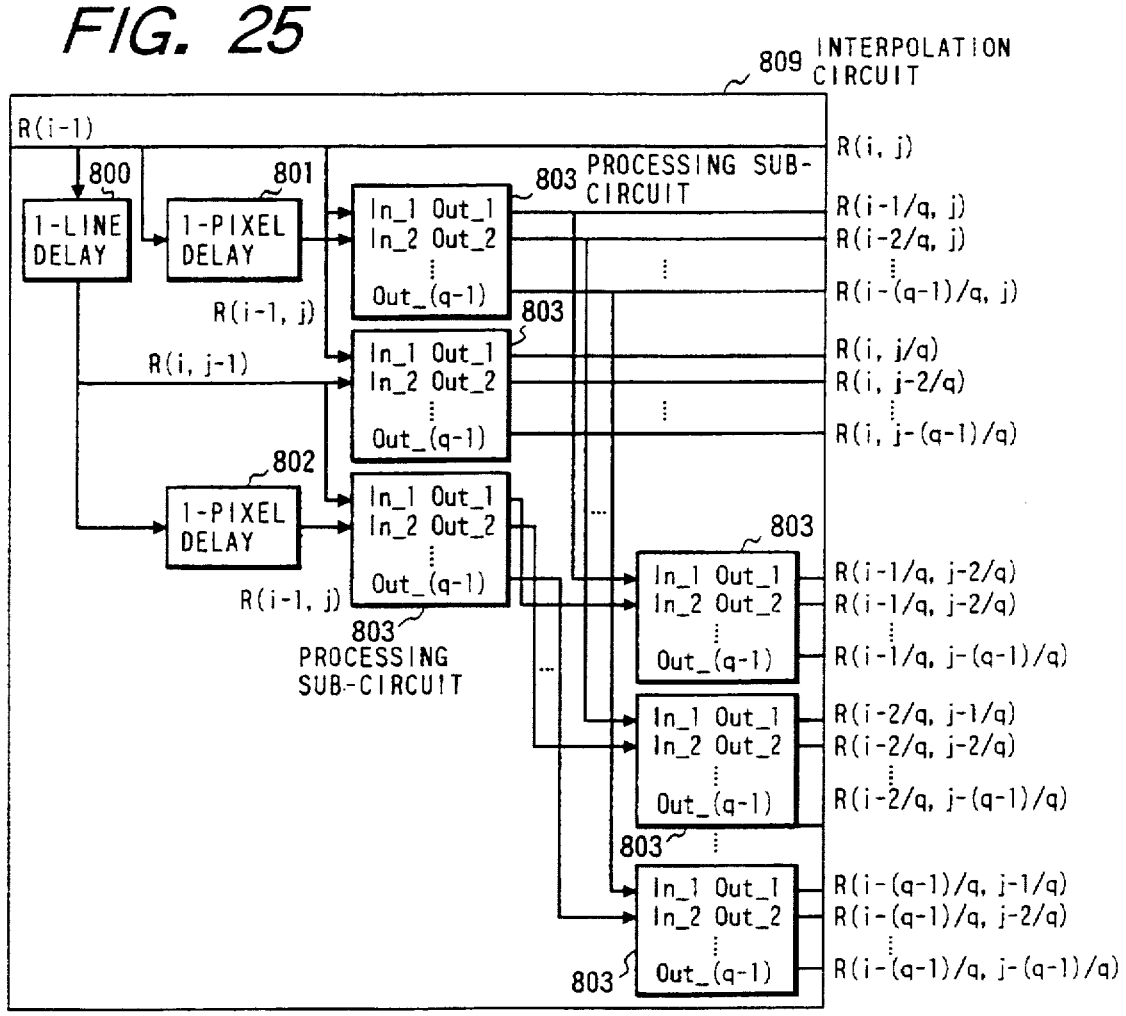
FIG. 25 is a generalized block circuit diagram, illustrating basic principles of an interpolation circuit used in the circuit of FIG. 24.

With the embodiment described above, a fractional motion vector detection precision of 0.5 (i.e. ½ of the pitch of the pixels, in each of the horizontal and vertical directions of a frame) is obtained, and each of the horizontal and vertical components of the fractional motion vector are obtained in the range −0.5 to 0.5. In general the invention can provide a motion vector detection precision of 1/q, where q is an integer. This will be described referring to FIG. 25, which is a block circuit diagram of an interpolation circuit 809 which corresponds to the general case of the interpolation circuit 1109 of FIG. 24 above. In FIG. 25, the directly supplied pixel values and delayed pixel values R(i,j), R(i−1,j), F(i,j−1) and R(j−1,i), produced using a 1-line delay element and two 1-pixel delay elements as described above for FIG. 24, are supplied to respective processing sub-circuits 803, each of which receives two inputs.

In FIG. 25, pixel values or interpolated pixel values R(i−k, j−k) are generated, where k takes values in the range:

$$0, 1/q, 2/q, 3/q, \ldots (q-1)/q,$$

in accordance with the desired degree of precision of motion vector detection. These values produced from the interpolation circuit 809 of FIG. 25 are supplied to respective ones of a set of processors, equal in number to the required number of candidate blocks within the restricted search range. Each processor is configured as described for the embodiment of FIG. 24, and cumulatively calculates the absolute value of one of the following absolute difference values:

|R(i−a,j−a)−S(i,j)|
|R(i−b,j−a)−S(i−1,j)|
|R(i−a,j−b)−S(i,j−1)|
|R(i−b,j+b)−S(i−1,j−1)|

Where "a" takes the values 0, 1/q, 2/q, 3/q, . . . (q−1)/q, and where "b" takes the values 1/q, 2/q, 3/q, . . . (q−1)/q.

Each processor thereby derives an inter-block error value $D_{c,d}$, where c and d each take the values:

$-(q-1)/q, -(q-2)/q, -(q-3)/q \ldots -1/q, 2/q, 3/q, \ldots, (q-1)/q$

It can thus be seen that a motion vector detection precision of $1/q$ pixel is obtained, within a restricted search range which extends from $-(q-1)/q$ to $(q-1)/q$ in each of the horizontal and vertical directions of a frame.

Figure 26:
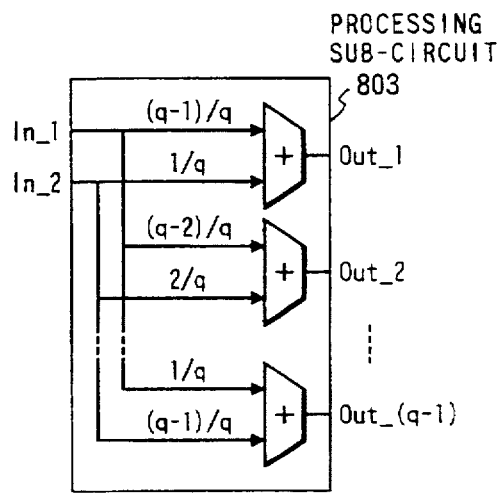
FIG. 26 illustrates the basic principles of each of a plurality of processing sub-circuits shown in the interpolation circuit of FIG. 25.

FIG. 26 is a circuit diagram of each processing sub-circuit 803 shown in FIG. 25. As shown, each processing sub-circuit 803 is made up of one or more two-input adders, with each of the two inputs ($In_1$, $In_2$) to the processing sub-circuit being multiplied by a specific factor before being supplied to an input of an adder.

It can thus be understood that the invention enables a fractional precision motion vector detection apparatus to be provided, having any arbitrary degree of precision, and having a detection range that extends to positive and negative values in both the horizontal and vertical directions of the object block.

What is claimed is:

1. A motion vector detection apparatus for deriving, with respect to a search range formed of picture element values defined within a reference image, fractional precision motion vector information for an object block of picture elements defined within an object image, said object image and reference image being mutually displaced in time within a stream of successive images each expressed as an array of picture elements, and including means for successively supplying picture element values of said object block and of said search range in respective specific sequences, wherein said motion vector detection apparatus comprises:

interpolation circuit means coupled to receive said search range picture element values, responsive to each of said search range picture element values for outputting a set of picture element values comprising said each search range picture element value together with a plurality of associated interpolated picture element values;

delay circuit means coupled to receive said object block picture element values, responsive to each of said object block picture element values for outputting a set of picture element values comprising said each object block picture element value together with a plurality of associated delayed picture element values;

a plurality of processor circuits equal in number to a number of candidate blocks which are defined within said search range, each of said candidate blocks being of identical size to said object block, each of said processor circuits being coupled to said interpolation circuit means and delay circuit means and including means for calculating a value of absolute difference between one of said set of picture element values from said interpolation circuit means and one of said set of picture element values from said delay circuit means and means for calculating a cumulative sum value of said absolute difference values for one of said candidate blocks; and minimum value detection circuit means for detecting a smallest one of respective cumulative sum values produced from said processor circuits, and for thereby detecting one of said candidate blocks having maximum correlation with said object block, to thereby obtain fractional precision motion vector information for said object block with respect to said search range;

wherein said interpolation circuit comprises means for generating said interpolated picture element values such that said interpolated picture element values include, in relation to each of said object block picture element values, interpolated picture element values having positive and negative positions in relation to said each object block picture element value, in both row and column directions of said object block.

2. A motion vector detection apparatus including means for operating on picture element values of an object block of picture elements defined within an object image and on picture element values of a main search range comprising a plurality of picture elements defined in a reference image, to detect one of a plurality of first candidate blocks of picture elements having maximum correlation with said object block, said object image and reference image being mutually displaced in time within a stream of successive images each expressed as an array of picture elements, each of said first candidate blocks being within said main search range and being of identical size to said object block, and means for successively supplying picture element values within a restricted search range, said restricted search range consisting of picture element values from said reference image including the values of said first candidate block having maximum correlation, and for successively supplying the picture element values of said object block, and wherein said motion vector detection apparatus comprises:

interpolation circuit means coupled to receive said restricted search range picture element values, responsive to each of said restricted search range picture element values for outputting a set of picture element values comprising said each restricted search range picture element value together with a plurality of associated interpolated picture element values;

delay circuit means coupled to receive said object block picture element values, responsive to each of said object block picture element values for outputting a set of picture element values comprising said each object block picture element value together with a plurality of associated delayed picture element values;

a plurality of processor circuits equal in number to a number of second candidate blocks defined within said restricted search range, each of said processor circuits being coupled to said interpolation circuit means and delay circuit means and including means for calculating a value of absolute difference between one of said set of picture element values from said interpolation circuit means and one of said set of picture element values from said delay circuit means and means for calculating a cumulative sum value of said absolute difference values for a corresponding one of said second candidate blocks;

minimum value detection circuit means for detecting a smallest one of respective cumulative sum values produced from said processor circuits, and for thereby detecting one of said second candidate blocks having maximum correlation with said object block; and combining circuit means for combining motion vector information expressed by respective positions of said maximum correlation first candidate block and maximum correlation second candidate block within said reference image, to derive fractional precision motion vector information for said object block;

wherein said interpolation circuit comprises means for generating said interpolated picture element values such that said interpolated picture element values include, in relation to each of said object block picture element values, interpolated picture element values having positive and negative positions in relation to said each object block picture element value, in both row and column directions of said object block.

3. A motion vector detection apparatus according to claim 2 wherein said restricted search range picture element values are supplied to said interpolation circuit means in respective clock periods and successive rows of said restricted search range picture element values are supplied to said interpolation circuit means in respective line periods, and wherein said interpolation circuit comprises:

first 1-clock period delay means (1103) for delaying said search range picture element values supplied to said interpolation circuit by one clock period, to produce successive first delayed picture element values;

1-line period delay means (1102) for delaying said search range picture element values supplied to said interpolation circuit by one line period, to produce successive second delayed picture element values;

second 1-clock period delay means (1104) for delaying, by one clock period, said second delayed picture element values, to produce successive third delayed picture element values;

at least one first adder circuit (1105), for multiplying said search range picture element values supplied to said interpolation circuit by a predetermined factor, multiplying said first delayed picture element values by a predetermined factor, and adding together each pair of values resulting from said multiplications to obtain successive first interpolated values;

at least one second adder circuit (1106), for multiplying said search range picture element values supplied to said interpolation circuit by a predetermined factor, multiplying said second delayed picture element values by a predetermined factor, and adding together each pair of values resulting from said multiplications to obtain successive second interpolated values;

at least one third adder circuit (1104), for multiplying said second delayed picture element values by a predetermined factor, multiplying said third delayed picture element values by a predetermined factor, and adding together each pair of values resulting from said multiplications to obtain successive intermediate interpolated values; and at least one fourth adder circuit (1108), for multiplying said first interpolated values by a predetermined factor, multiplying said intermediate delayed picture element values by a predetermined factor, and adding together each pair of values resulting from said multiplications to obtain successive third interpolated values.

* * * * *